(12) United States Patent
Horst

(10) Patent No.: US 7,610,851 B1
(45) Date of Patent: Nov. 3, 2009

(54) BALE STACKER

(75) Inventor: Mark Horst, Ethel (CA)

(73) Assignee: Marcrest Manufacturing Inc., Ethel, ON ( * ) Notice: Subject to any disclaimer, the term of this patent is extended or adjusted under 35 U.S.C. 154(b) by 0 days.

(21) Appl. No.: 11/853,523

(22) Filed: Sep. 11, 2007

Related U.S. Application Data

(60) Provisional application No. 60/825,172, filed on Sep. 11, 2006.

(51) Int. Cl.
B65B 27/12 (2006.01)
B65B 35/50 (2006.01)
A01D 90/08 (2006.01)

(52) U.S. Cl. .................. 100/3; 100/7; 100/31; 100/179; 100/188 R; 53/438; 53/447; 53/529; 53/540; 414/789.2; 414/790.3

(58) Field of Classification Search ............ 100/3, 100/7, 8, 17, 18, 100, 179, 187, 188 R, 189, 100/191, 24, 31; 414/789.7, 789.2, 790.3; 53/438, 447, 529, 540, 586
See application file for complete search history.

(56) References Cited

U.S. PATENT DOCUMENTS

| | | | |
|---|---|---|---|
| 1,234,078 A | 7/1917 | Pate | |
| 1,671,966 A | 6/1928 | Burkholder | |
| 1,819,480 A | 8/1931 | Paxton | |
| 2,209,740 A * | 7/1940 | Steinhauer | 100/215 |
| 2,428,672 A | 10/1947 | McClellan et al. | |
| 3,070,006 A | 12/1962 | Raney et al. | |
| 3,099,952 A * | 8/1963 | Dixon et al. | 100/3 |
| 4,043,461 A | 8/1977 | Castro | |
| 4,059,049 A * | 11/1977 | Tillgren | 100/41 |
| 4,074,623 A | 2/1978 | White | |
| 4,179,017 A | 12/1979 | Tilley | |
| 4,212,579 A | 7/1980 | Stromberg | |
| 4,359,306 A | 11/1982 | Zimmerman | |
| 4,436,029 A | 3/1984 | Goldhammer | |
| 4,456,235 A | 6/1984 | Colglazier et al. | |

(Continued)

FOREIGN PATENT DOCUMENTS

CA 2312768 6/1999

(Continued)

OTHER PUBLICATIONS

Arcusin brochure re Auto Stack Automatic Bale Loader, date of publication unknown (Applicant became aware of this reference no later than Dec. 2004).

*Primary Examiner*—Jimmy T Nguyen

(57) ABSTRACT

A bale stacker for consolidating a plurality of bales into a bale bundle. The bale stacker includes a compression chamber at least partially defined by a floor, sidewalls, and a ceiling. The compression chamber extends between an upstream opening and a downstream opening thereof. The bales are receivable in the compression chamber via the upstream opening and the bale bundle is configured to exit the compression chamber via the downstream opening. The compression chamber ceiling includes a substantially planar rear portion positioned substantially parallel to the floor. The compression chamber ceiling also includes a front portion positioned upstream from the rear portion, and located in a non-parallel relationship relative to the floor for engaging the bales as they are moved past the front portion in a downstream direction of travel toward the downstream opening, so that the bales are compressed between the front portion and the floor.

17 Claims, 23 Drawing Sheets

U.S. PATENT DOCUMENTS

| | | | | |
|---|---|---|---|---|
| 4,498,829 | A | 2/1985 | Spikes | |
| 4,676,153 | A | 6/1987 | Ast | |
| 4,718,335 | A | 1/1988 | Ast | |
| 4,741,425 | A | 5/1988 | Land | |
| 4,783,892 | A | 11/1988 | Hergeth | |
| 4,854,809 | A | 8/1989 | Rhodes | |
| 5,094,338 | A * | 3/1992 | Schneider et al. | 198/468.01 |
| 5,123,338 | A | 6/1992 | Mathis | |
| 5,211,345 | A | 5/1993 | Siebenga | |
| 5,224,827 | A | 7/1993 | Wong | |
| 5,224,911 | A | 7/1993 | Wong | |
| 5,299,684 | A * | 4/1994 | Ransom | 206/83.5 |
| 5,353,698 | A * | 10/1994 | Robbins | 100/3 |
| 5,405,229 | A | 4/1995 | Tilley et al. | |
| 5,478,194 | A | 12/1995 | Tilley et al. | |
| 5,501,562 | A | 3/1996 | Zimmerman | |
| 5,542,803 | A | 8/1996 | Driggs | |
| 5,607,274 | A | 3/1997 | Cook | |
| 5,690,461 | A | 11/1997 | Tilley | |
| 5,697,758 | A | 12/1997 | Tilley | |
| 5,704,283 | A * | 1/1998 | Wiedel | 100/3 |
| 5,735,197 | A | 4/1998 | Kleine | |
| 5,887,504 | A | 3/1999 | Gombos et al. | |
| 5,921,738 | A | 7/1999 | Rempel | |
| 6,016,731 | A | 1/2000 | Gombos et al. | |
| 6,079,926 | A | 6/2000 | Cox et al. | |
| 6,171,046 | B1 | 1/2001 | Nutcher | |
| 6,182,563 | B1 | 2/2001 | Brown, Jr. | |
| 6,364,591 | B1 | 4/2002 | Stevenson | |
| 6,397,738 | B1 | 6/2002 | Brown, Jr. | |
| 6,655,266 | B2 | 12/2003 | Brown, Jr. | |
| 7,080,494 | B2 * | 7/2006 | Toews | 53/399 |
| 2004/0076507 | A1 | 4/2004 | Forhaug et al. | |

FOREIGN PATENT DOCUMENTS

| | | |
|---|---|---|
| CA | 2548635 | 6/1999 |
| CA | 2548703 | 6/1999 |
| FR | 2581828 | 11/1986 |

* cited by examiner

BALE STACKER

This application claims the benefit of U.S. Provisional Patent Application No. 60/825,172, filed Sep. 11, 2006.

FIELD OF THE INVENTION

This invention is related to a bale stacker for consolidating a plurality of bales into a bale bundle.

BACKGROUND OF THE INVENTION

In recent years, transportation of forage over relatively long distances has been economically viable due to the prices paid for good quality forage in certain areas. Typically, a bale of hay 10 is formed which is about 18 inches wide (W), 14 inches high (H), and 35 inches in length (L) (FIG. 1A). As can be seen in FIG. 1A, the bale customarily rests on a bottom wall (not shown) having an area of L×W, presenting an identical top wall (also having an area of L×W), and exposing two sidewalls, each with an area of H×W. If the forage is to be transported over long distances, it has been found to be convenient to tie a number of individual bales together into relatively large bale bundles.

The practice of tying a number of individual bales together to form bale bundles has developed in order to permit more economical handling of the forage in connection with its storage and transportation. In the usual current practice, twenty-one bales are stacked in seven vertical stacks of three bales each and then tied together, to form a bale bundle.

Machines to form bales into bale bundles are known. However, the prior art machines have a number of disadvantages.

There is a need for an improved machine for forming bales into bale bundles.

SUMMARY OF THE INVENTION

In its broad aspect, the invention provides a bale stacker for consolidating a plurality of bales into a bale bundle. The bale stacker includes a compression chamber at least partially defined by a floor, two substantially parallel chamber sidewalls spaced apart from each other by a predetermined distance, and a ceiling. The compression chamber extends between an upstream opening and a downstream opening thereof. The bales are receivable in the compression chamber via the upstream opening and the bale bundle is configured to exit the compression chamber via the downstream opening. The compression chamber ceiling includes a substantially planar rear portion positioned substantially parallel to the floor. Also, the compression chamber ceiling includes a front portion positioned upstream from the rear portion. The front portion is positioned in a non-parallel relationship relative to the floor for engaging the bales as they are moved past the front portion in a downstream direction of travel toward the downstream opening, so that the bales are compressed between the front portion and the floor.

Each of the bales has top and bottom walls, two sidewalls, and two endwalls. In another aspect, the front portion has a length substantially aligned with the downstream direction of travel which is substantially less than one-half of a shorter dimension of the sidewall of each bale.

In another of its aspects, the bale stacker additionally includes a loading chamber in which the bales are positioned in columns.

In yet another of its aspects, the bale stacker additionally includes a transfer assembly for moving the columns of the bales into the compression chamber.

In another aspect, the bale stacker also includes an injector assembly for moving the bales into the loading chamber, so that the bales are formed into the columns in the loading chamber.

In yet another aspect, the injector assembly moves each bale at least partially upwardly into the loading chamber.

In another of its aspects, the bale stacker also includes a table assembly for transporting the bales consecutively to the injector assembly and positioning each bale for movement thereof by the injector assembly.

BRIEF DESCRIPTION OF THE DRAWINGS

The invention will be better understood with reference to the attached drawings, in which.

DETAILED DESCRIPTION

Figure 1A:
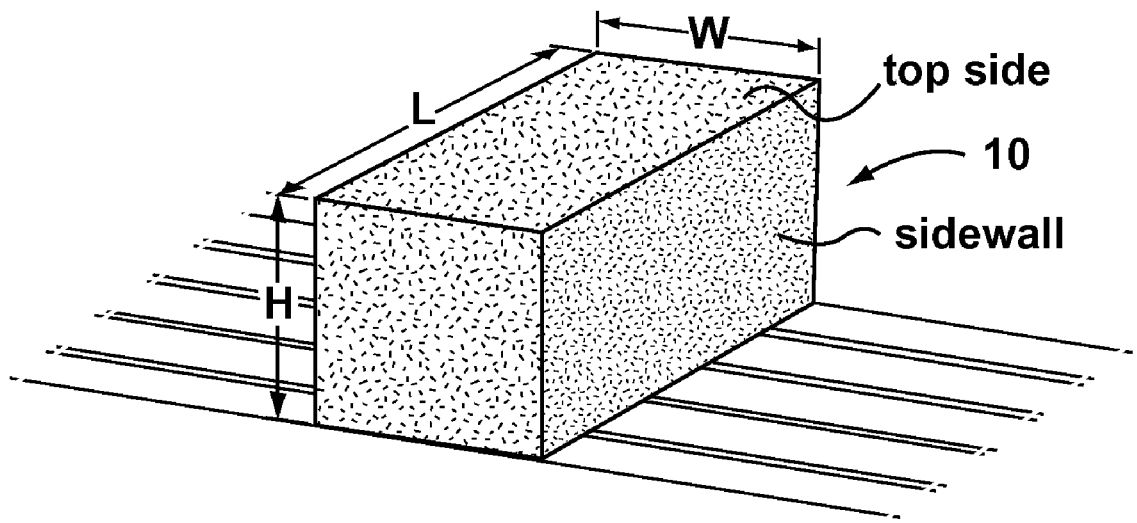
FIG. 1A (previously discussed) is an isometric view of an individual bale of the prior art.
Figure 1B:
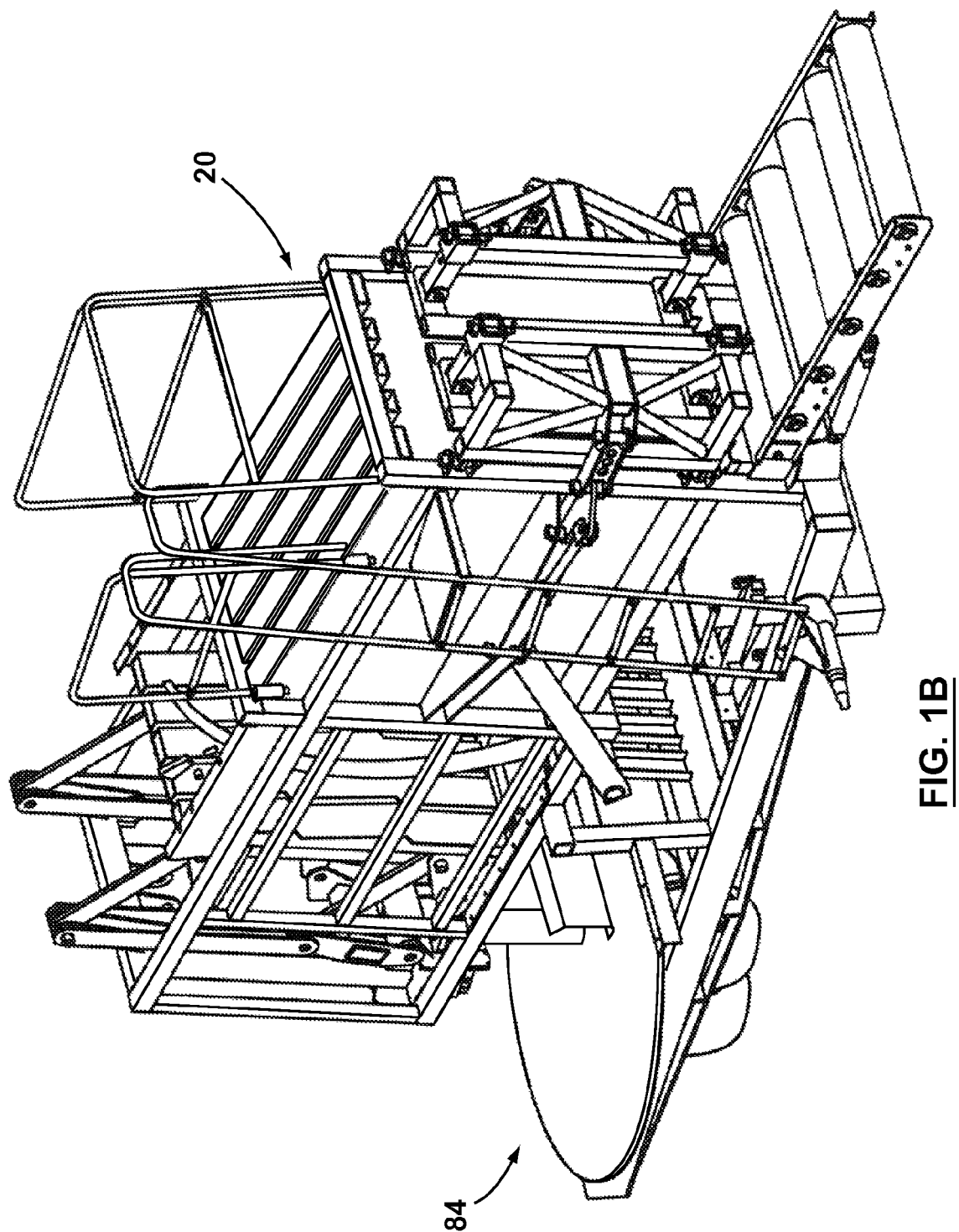
FIG. 1B is an isometric view of an embodiment of the bale stacker of the invention, drawn at a smaller scale.
Figure 2:
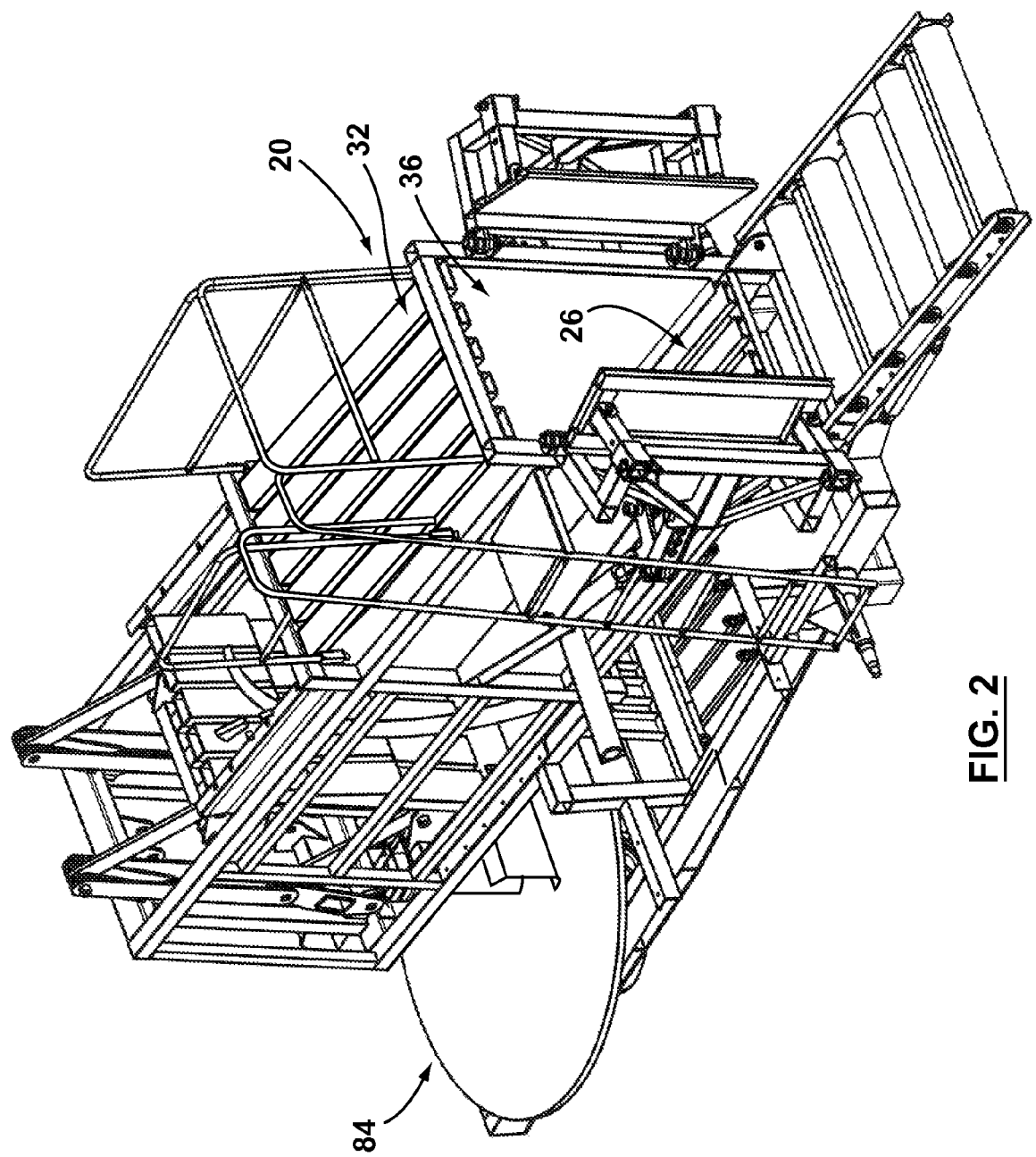
FIG. 2 is an isometric view of the bale stacker of FIG. 1, showing rear doors thereof in an open position.

Reference is first made to FIGS. 1B-5 to describe an embodiment of a bale stacker of the invention referred to generally by the numeral 20. The bale stacker 20 is for consolidating a plurality of bales 10 into a bale bundle 22 (FIG. 4D). The bale stacker 20 includes a compression chamber 24 (FIG. 3A) at least partially defined by a floor 26 (FIG. 2), two substantially parallel chamber sidewalls 28, 30 spaced apart from each other by a predetermined distance "D" (FIG. 3B), and a ceiling 32. As can be seen in FIG. 3A, the compression chamber 24 extends between an upstream opening 34 (FIG. 4) and a downstream opening 36 (FIG. 2). Preferably, the bales 10 are receivable in the compression chamber 24 via the upstream opening 34 and the bale bundle 22 is configured to exit the compression chamber 24 via the downstream opening 36, as will be described. It is preferred that the compression chamber ceiling 32 includes a substantially planar rear portion 38 which is positioned substantially parallel to the floor 26. In one embodiment, the compression chamber ceiling 32 also includes a front portion 40 which is positioned upstream from the rear portion 38 (FIG. 3A). Preferably, the front portion 40 is positioned in a non-parallel relationship relative to the floor 26 for engaging the bales 10 as the bales 10 are moved past the front portion 40 in a downstream direction of travel toward the downstream opening 36, so that the bales 10 are compressed between the front portion 40 and the floor 26.

Figure 3A:
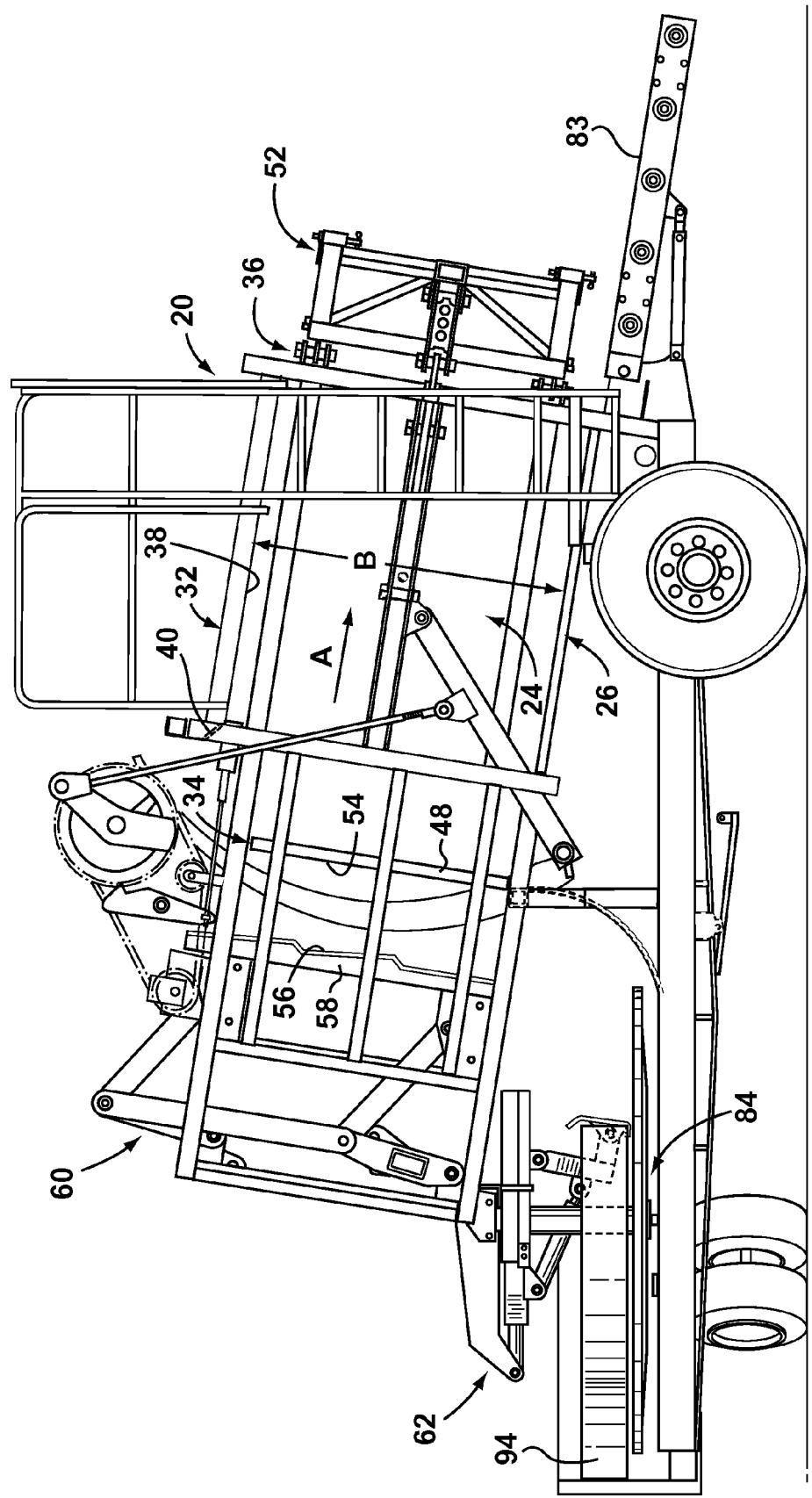
FIG. 3A is a side view of the bale stacker of FIG. 2, drawn at a larger scale.

The downstream direction of travel is schematically indicated by arrow "A" in FIG. 3A.

It is preferred that the rear portion 38 engages the bales 10 after the bales are moved downstream past the front portion 40 so that the rear portion 38 maintains compression of the bales 10 in a direction which is substantially orthogonal to the floor 26. Preferably, the rear portion 38 is spaced apart from the floor 26 by a distance ("B") selected so that the bales, when positioned between the rear portion 38 and the floor 26, are compressed to an extent desired, as will be described (FIG. 3A). Such compression is in a direction which is substantially orthogonal to the floor 26.

It is also preferred that the front portion 40 has a length ("C") (FIG. 7A) substantially aligned with the downstream direction of travel which is substantially less than one-half of a shorter dimension "H" (FIG. 1A) of the sidewall of each bale 10. (As can be seen in FIG. 1A, the shorter dimension "H" of the sidewall is the shorter of the two dimensions which substantially define the sidewall.) As will be described, the bales 10 preferably are ultimately positioned in the compression chamber resting on one sidewall thereof, with the other sidewall presented upwardly.

Preferably, the front portion 40 is positioned at an angle (i.e., an angle which is not zero) relative to the floor 26, i.e., the front portion 40 is in a non-parallel relationship with the floor. Also, it is preferred that the front portion 40 is positioned in an angle relative to the floor 26 which is between approximately 30 degrees and approximately 75 degrees. Preferably, the front portion 40 is positioned at approximately 45 degrees relative to the floor 26 (FIG. 3A).

As can be seen in FIGS. 4A-4D, the bales 10 preferably are positioned in the compression chamber 24 in columns 42. The bale stacker 20 preferably includes a loading chamber 44 positioned adjacent to the upstream opening 34 of the compression chamber 24. FIGS. 7A-7D show bales 10 being loaded into the loading chamber 44, and put into the columns 42 in the loading chamber 44. The bales 10 preferably are positioned in the columns 42 as they are loaded into the loading chamber 44, as will also be described.

As can be seen in FIG. 3A, the bale stacker 20 includes front doors 48 which, when in a closed position, substantially block the upstream opening 34. Similarly, the bale stacker 20 includes one or more rear doors 52 which, when in a closed position, at least partially block the downstream opening 36 (FIG. 3A). (Preferably, there are two rear doors 52, which are shown in an open position in FIG. 3B, and in a closed position in FIG. 3C.) The loading chamber 44 extends between a front surface 54 of the front doors 48, when the front doors 48 are in the closed position (FIG. 3A), and an engagement surface 56 of a platen 58 which is included in a transfer assembly 60.

The bale stacker 20 preferably also includes the transfer assembly 60. As well as the transfer assembly 60, the bale stacker 20 preferably additionally includes an injector assembly 62 for injecting the bales 10 into the loading chamber 44. The bales 10 preferably are positioned in columns 42 of three bales each in the loading chamber 44 by the injector assembly 62. The manner in which the injector assembly 62 injects the individual bales 10 is shown in FIGS. 7A-7D, and the operation of the transfer assembly 60 to push the columns 42 into the compression chamber 24 is shown in FIGS. 7E-7G.

Figure 7A:
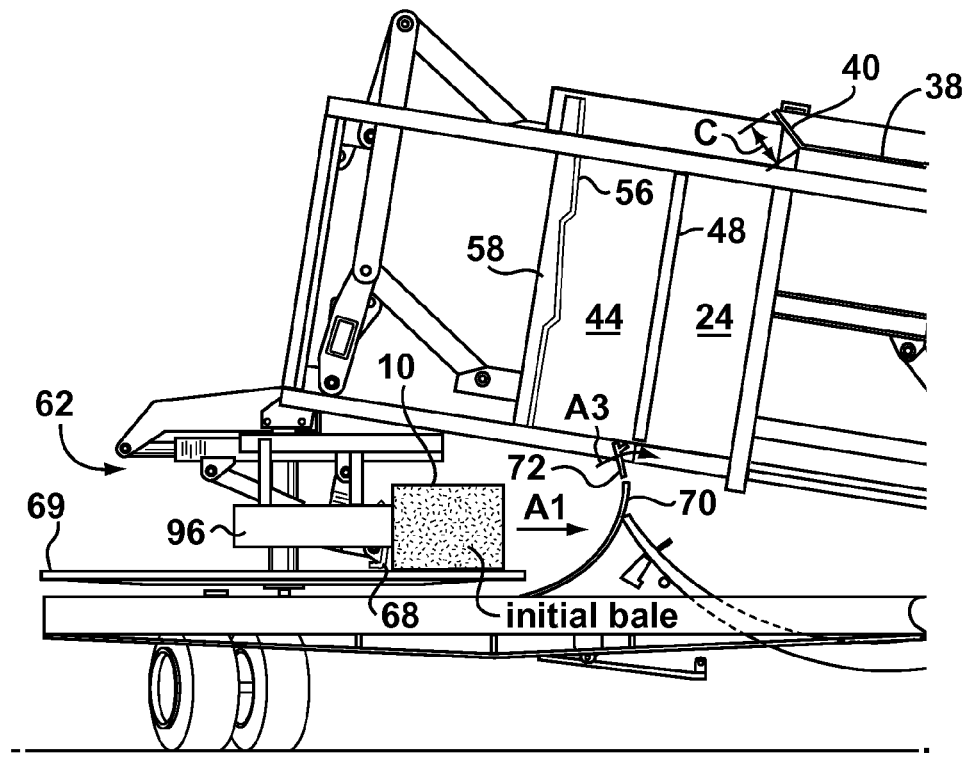
FIG. 7A is a side view of an embodiment of the injector assembly of FIG. 5 showing the injector assembly in a retracted condition and an initial bale positioned therein ready to be loaded into a loading chamber, drawn at a larger scale.
Figure 7B:
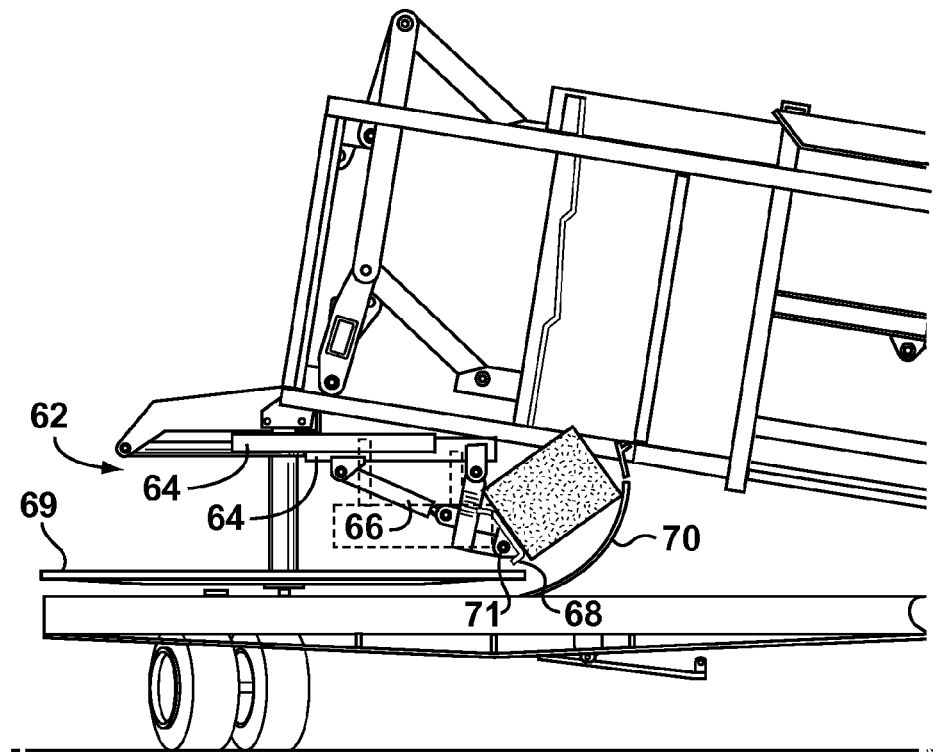
FIG. 7B is a side view of the injector assembly of FIG. 7A in an intermediate condition with the initial bale partially positioned in the loading chamber.

In FIG. 7A, the injector assembly 62 is shown in a retracted condition. As can be seen in FIG. 7B, the injector assembly 62 includes first and second hydraulic cylinders 64, 66 which are operably connected to a blade 68. The blade 68 is shown in a retracted position in FIG. 7A, in which the bale is receivable in front of the blade 68. Preferably, the bale 10 is positioned on a table surface 69, as will be described.

When the injector assembly 62 is activated, the first bale 10 to be positioned in a new column of bales (identified as an "initial bale" in FIG. 7A) is engaged by the blade 68, which, itself moved substantially horizontally to the right (as presented in FIG. 7A) by the first hydraulic cylinder 64, pushes the initial bale across the table surface 69 to the right as illustrated in FIG. 7A, i.e., in the direction indicated by arrow "A1" in FIG. 7A.

After it has been moved to the edge of the table surface 69, the initial bale is pushed further by the first hydraulic cylinder 64 (via the blade), and engages a curved guide element 70. As can be seen in FIGS. 7A and 7B, after the bale 10 first engages the curved guide element 70, the first hydraulic cylinder 64 continues to push the bale 10 further horizontally, i.e., to the right as shown in FIGS. 7A and 7B. As the bale is pushed further to the right, it rotates in a counterclockwise direction (as shown in FIGS. 7A and 7B), and the blade 68 pivots upwardly accordingly about a pivot point 71.

Figure 7C:
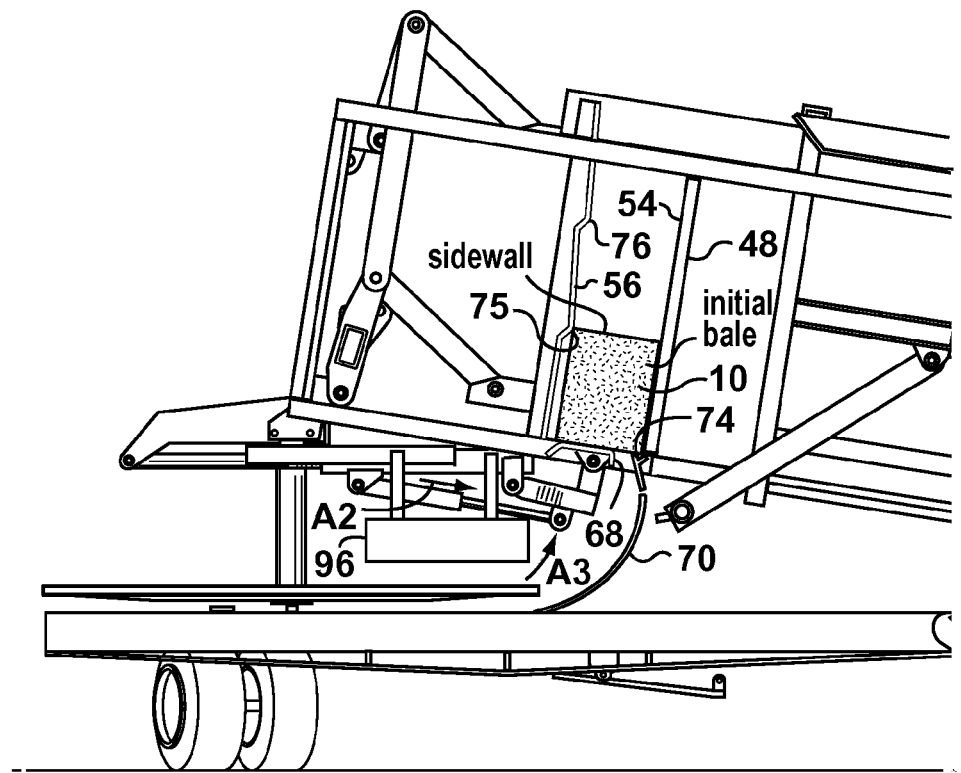
FIG. 7C is a side view of the injector assembly of FIG. 7A in an extended condition with the initial bale in a first (i.e., lowermost) position in the loading chamber.

The first hydraulic cylinder 64 is shown in FIG. 7B at its maximum extension. Once the first hydraulic cylinder 64 has reached its maximum extension, the second hydraulic cylinder 66 begins to extend. As shown in FIGS. 7B and 7C, the extension of the second hydraulic cylinder 66 in the direction indicated by arrow "A2" (FIG. 7C) causes the blade 68 to pivot upwardly and move along a curved path, as indicated by arrow "A3". Because of the positioning of the guide element 70, the bale is rotated (in a counterclockwise direction, as shown in FIG. 7B) by approximately 90 degrees as it is pushed upwardly into the loading chamber 44. As can be seen in FIGS. 7A-7C, due to this rotation during loading, the bale 10 is positioned in the loading chamber with the sidewalls thereof facing upwardly and downwardly, and the top and bottom sides facing the platen 58 and the front doors 48 respectively.

The blade 68 is shown in an extended position in FIG. 7C, in which both the first and second hydraulic cylinders 64, 66 are both extended to the greatest extent possible.

From the foregoing, it can be seen that the first hydraulic cylinder 64 is positioned to act in a substantially horizontal direction and the second hydraulic cylinder 66 is positioned to act at an angle relative to the horizontal (i.e., in a non-parallel relationship to the table surface), to provide at least partially vertical movement of the blade 68. The second hydraulic cylinder 66 acts in a direction which is not parallel to the direction in which the first hydraulic cylinder 64 acts. Preferably, the second hydraulic cylinder 66 is positioned at an angle of approximately 20 degrees relative to the table top surface.

Dogs 72 preferably are positioned at or near the top end of the guide element 70. The dogs 72 preferably are spring-loaded or otherwise biased to an open position, the dogs 72 being shown in the open position in FIGS. 7A-7D. Preferably, when the bale is pushed past the dogs 72 as the bale 10 is entering the loading chamber 44, the dogs 72 pivot in the direction indicated by arrow "A3" (FIG. 7A), to permit the bale to pass into the loading chamber 44. It is also preferred that, once the bale is in the loading chamber 44, the dogs 72 promptly return to the open position (as shown in FIG. 7C), and a portion 74 of the bale 10 engages the dogs 72 directly, so that the dogs 72 support the bale 10 (FIG. 7C). In addition, and as shown in FIG. 7C, an upper portion 75 of the bale 10 simultaneously engages the engagement surface 56 of the platen 58. In this way, the bale 10 is supported in the loading chamber 44 after it has been loaded therein.

A second bale and a third bale (identified as such in FIG. 7D) are subsequently loaded into the loading chamber 44 consecutively by the injector assembly 62 in the same manner as the initial bale. When it is loaded into the loading chamber 44, the second bale is pushed upwardly into the loading chamber 44, causing the initial bale to be displaced upwardly. Similarly, the third bale subsequently is loaded upwardly into the loading chamber 44 by the injector assembly 62 in the same way, moving the second and initial bales upwardly, to result in the column 42 shown in FIG. 7D.

As noted above, the bales 10 are positioned in the column 42 resting on their sidewalls respectively, and the top and bottom sides of each bale face the platen 58 and the front doors respectively. Positioning the bales in this way appears to be advantageous, as will be described.

Figure 7D:
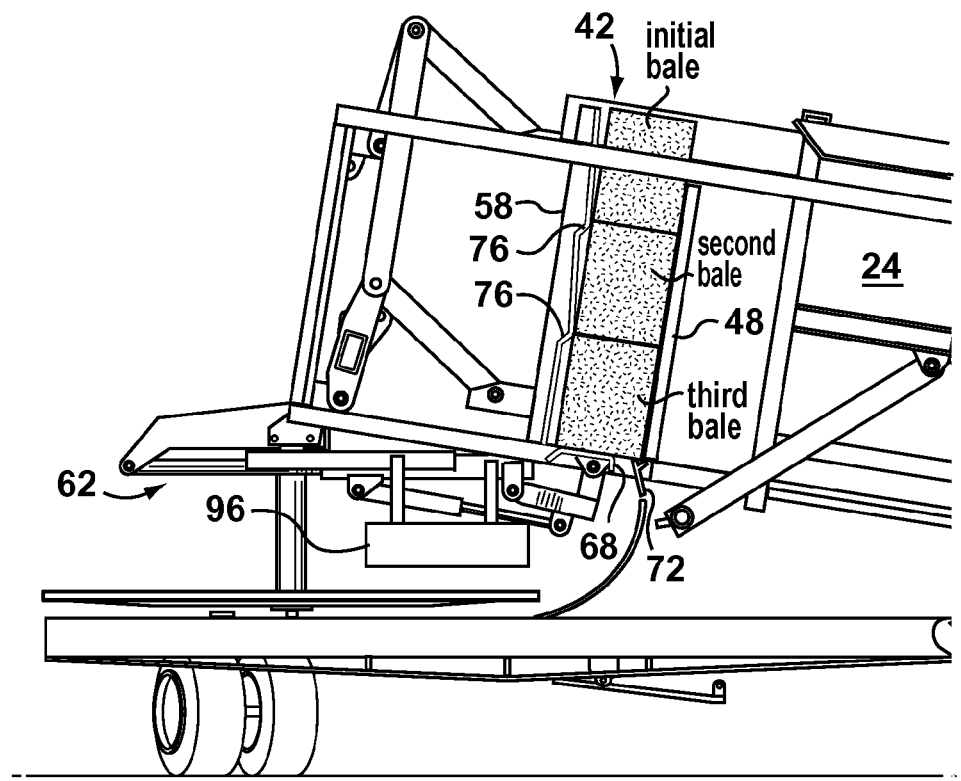
FIG. 7D is a side view of the injector assembly of FIG. 7A in an extended condition with a first column of three bales in the loading chamber, the initial bale of FIG. 7C being shown in a third position (i.e., highest) in the loading chamber.
Figure 7E:
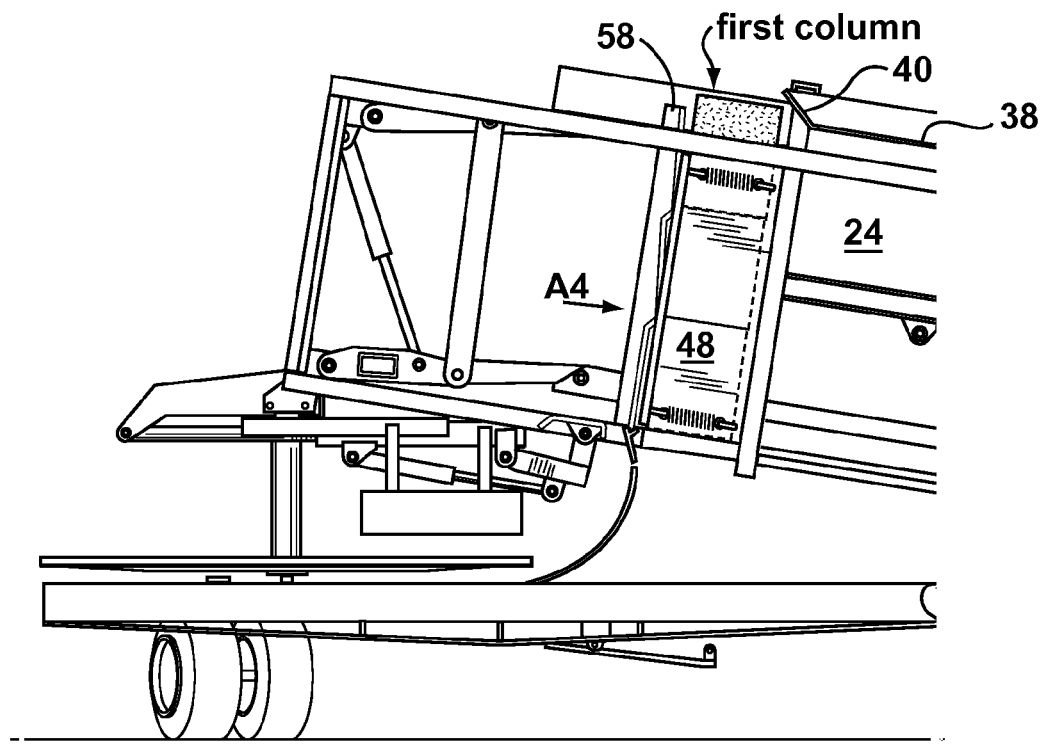
FIG. 7E is a partial cross-section of the loading chamber and the compression chamber showing the transfer assembly in an extended condition, after moving the first column of FIG. 7D through an upstream opening into the compression chamber.
Figure 7F:
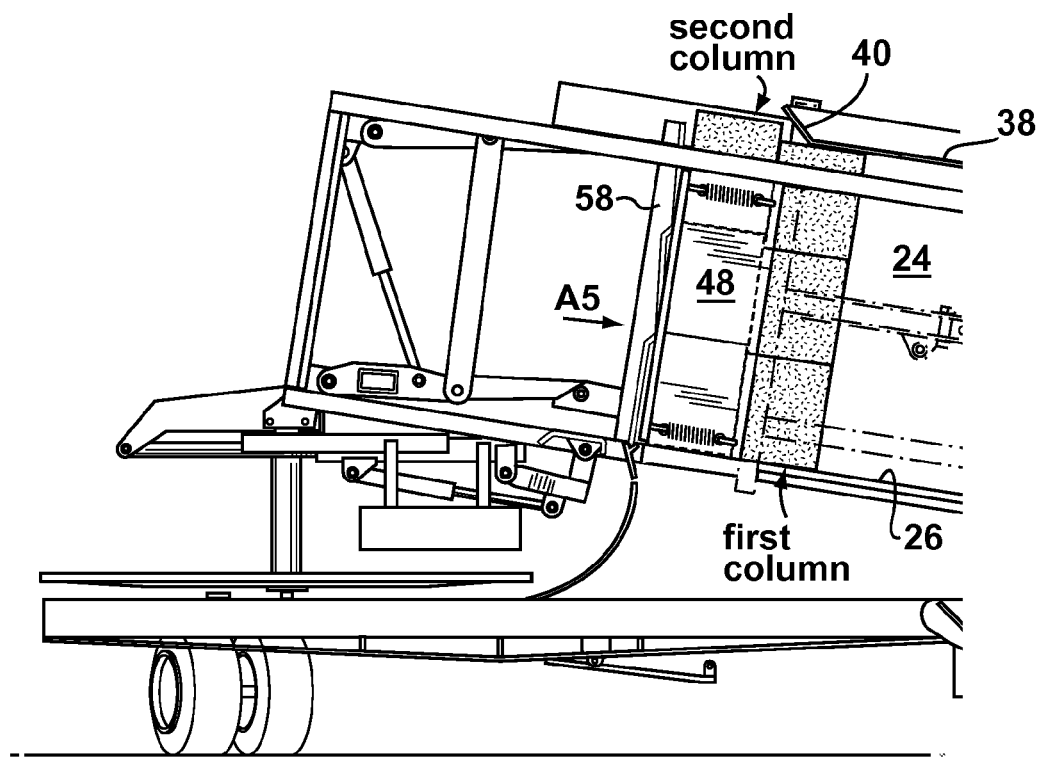
FIG. 7F is a partial cross-section of the loading and compression chambers, after the transfer assembly has moved a second column into the compression chamber toward a downstream opening thereof, the second column thereby pushing the first column further into the compression chamber.
Figure 7G:
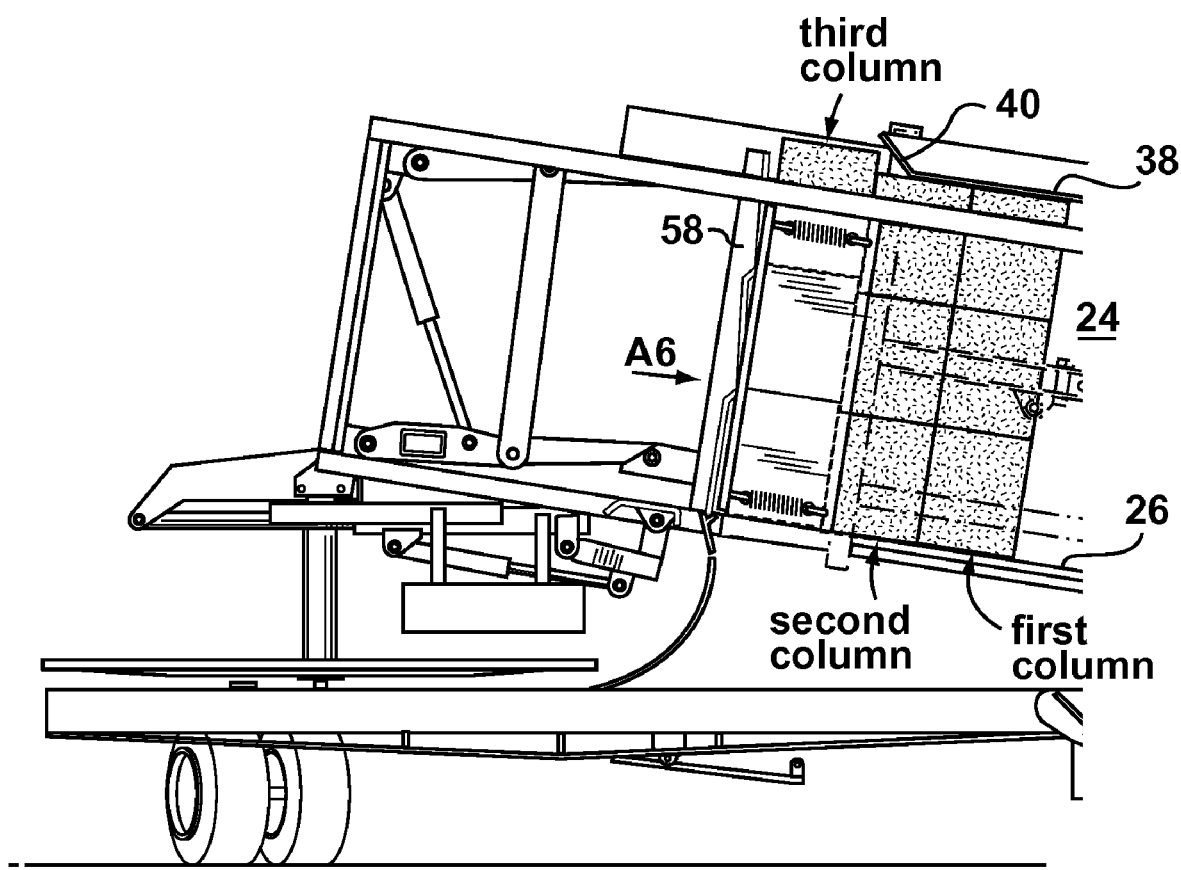
FIG. 7G is a partial cross-section of the loading and compression chambers, after the transfer assembly has moved a third column into the compression chamber, thereby pushing the first and second columns further into the compression chamber.

As can be seen in FIG. 7C, when the initial bale is positioned in the loading chamber 44, it is supported by the front surface 54 of the front doors 48. The front doors 48 are biased to a closed position, preferably by springs or any other suitable biasing means. As shown in FIG. 7D, when the first column 42 has been loaded in the loading chamber 44, the column 42 is partly held in place by the closed front doors 48. The bottom sides of the bales in the first column engage the front surface 54 of the front doors 48, and rest against the front surface 54.

As shown in FIGS. 7A-7G, the floor 26 is generally positioned at about 10 degrees relative to the horizontal. This position is selected in order to facilitate movement of the bundle 22 out the downstream opening.

The transfer assembly 60 is for moving (or pushing) the columns 42 into the compression chamber 24. Preferably, the platen 58 of the transfer assembly 60 includes ridges 76 in its engagement surface 56. The ridges 76 are positioned so that they engage the lower parts of the sidewalls of the bales which are facing the platen 58 when the column 42 is in position in the loading chamber 44 (FIG. 7D). When the column 42 is formed, the bales tend to overhang slightly towards the front. The ridges 76 are positioned as described above so as to counteract this tendency, i.e., the ridges 76 cause the bales in the column 42 to become somewhat better vertically aligned with each other because the ridges engage the lower parts of the sidewalls which face the platen 58 first.

Once the first column 42 is positioned in the loading chamber 44, the platen 58 is moved in the direction shown by arrow "A4" in FIG. 7E, pushing the first column of bales through the front doors 48. As can be seen in FIG. 7E, once the first column of bales has been pushed past the front doors 48, the first column holds the front doors 48 in an open position. The first column is positioned in FIG. 7E to provide some support for the bales in the immediately following column, as such bales are loaded. In this way, the first column of bales and subsequent columns of bales serve to assist in supporting each column of bales subsequent thereto as each such subsequent column is loaded respectively.

After the initial and second bales in a column have been loaded, the blade 68 is retracted, i.e., both of the hydraulic cylinders sequentially retract (the second hydraulic cylinder 66 first, and the first hydraulic cylinder 64 next) to their fully retracted positions. However, after the third bale is loaded for a particular column, the blade 68 remains in the extended position, to support the column (FIG. 7D). This has been found to be advantageous because the front edge of the lowermost bale in the column tends to drop down if not supported by the blade 68. The blade 68 remains in the extended position until the column 42 has been pushed into the compression chamber 24.

FIG. 7F shows the platen 58 after it has pushed (in the direction shown by arrow "A5" in FIG. 7F) a second column of bales (as identified in FIG. 7F) into the compression chamber 24. As can be seen in FIG. 7F, when the second column of bales is pushed into the compression chamber 24, the first column of bales engages the front portion 40 of the compression chamber ceiling 32, causing the first column of bales to be compressed.

FIG. 7G shows a third column of bales (identified in FIG. 7G) after it has been pushed (in the direction shown by arrow "A6") into the compression chamber 24. As can be seen in FIG. 7G, when the third column of bales is pushed into the compression chamber 24, the third column pushes the second column of bales further into the compression chamber 24, and the second column of bales in turn pushes the first column further into the compression chamber 24. Also, as the third column is pushed into the compression chamber by the platen 58, the second column engages the front portion 40 of the ceiling 32, which compresses the second column. The first column remains compressed, by the rear portion 38.

Figure 4:
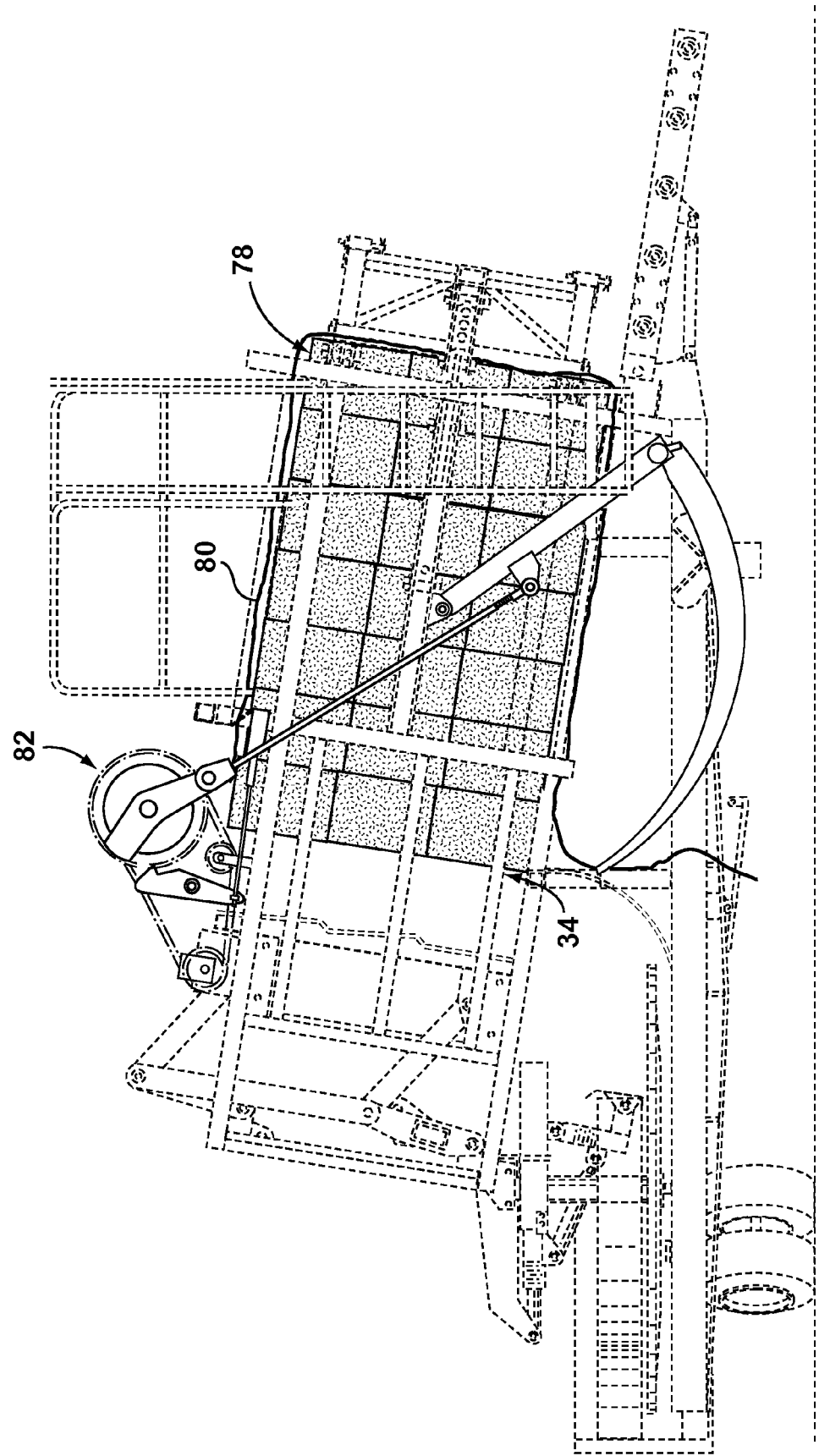
FIG. 4 is a partial cross-section of the bale stacker of FIG. 3A, showing a plurality of bales in columns positioned in a compression chamber of the bale stacker with a twining material positioned around the bales.

In accordance with customary practice, the bundle 22 preferably includes seven columns of three bales each, i.e., 21 bales in all. A group 78 of 21 bales in seven columns ready to be tied and further compressed (i.e., ready to be consolidated into a cohesive bundle) is shown in FIG. 4. Also, FIG. 4 shows a tying material 80 which defines a pocket into which the seven columns of bales in the group 78 preferably have been pushed, one column at a time, as described above. (The tying material 80 is not shown in FIGS. 7E-7G for clarity of illustration.) The tying material 80 is shown in FIG. 4 prior to its being tied around the bales 78 using a knotter 82. The technique of tying bales and bundles of bales generally, and using knotters therefor, is well-known, and therefore such technique does not need to be described in detail here.

FIGS. 4A-4D show a series of steps taken after the seventh column (i.e., the final column in the group 78) of bales has been loaded. It will be understood that tying material 80 is present in FIGS. 4A-4D, although the tying material is not shown, for clarity of illustration.

Figure 4A:
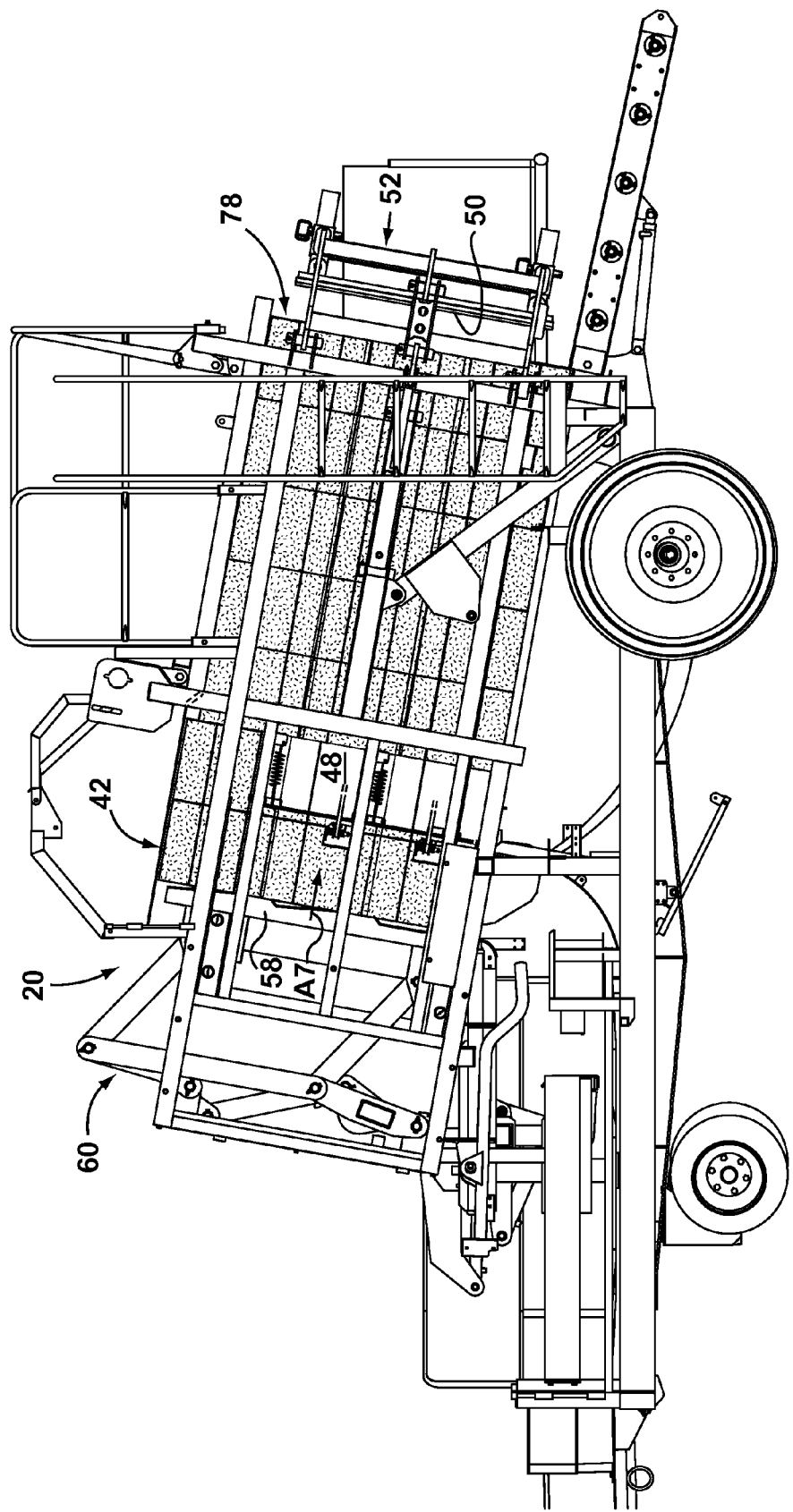
FIG. 4A is a partial cross-section of the bale stacker of FIG. 4 with a transfer assembly positioned to move a final column in a bale bundle into the compression chamber.
Figure 4B:
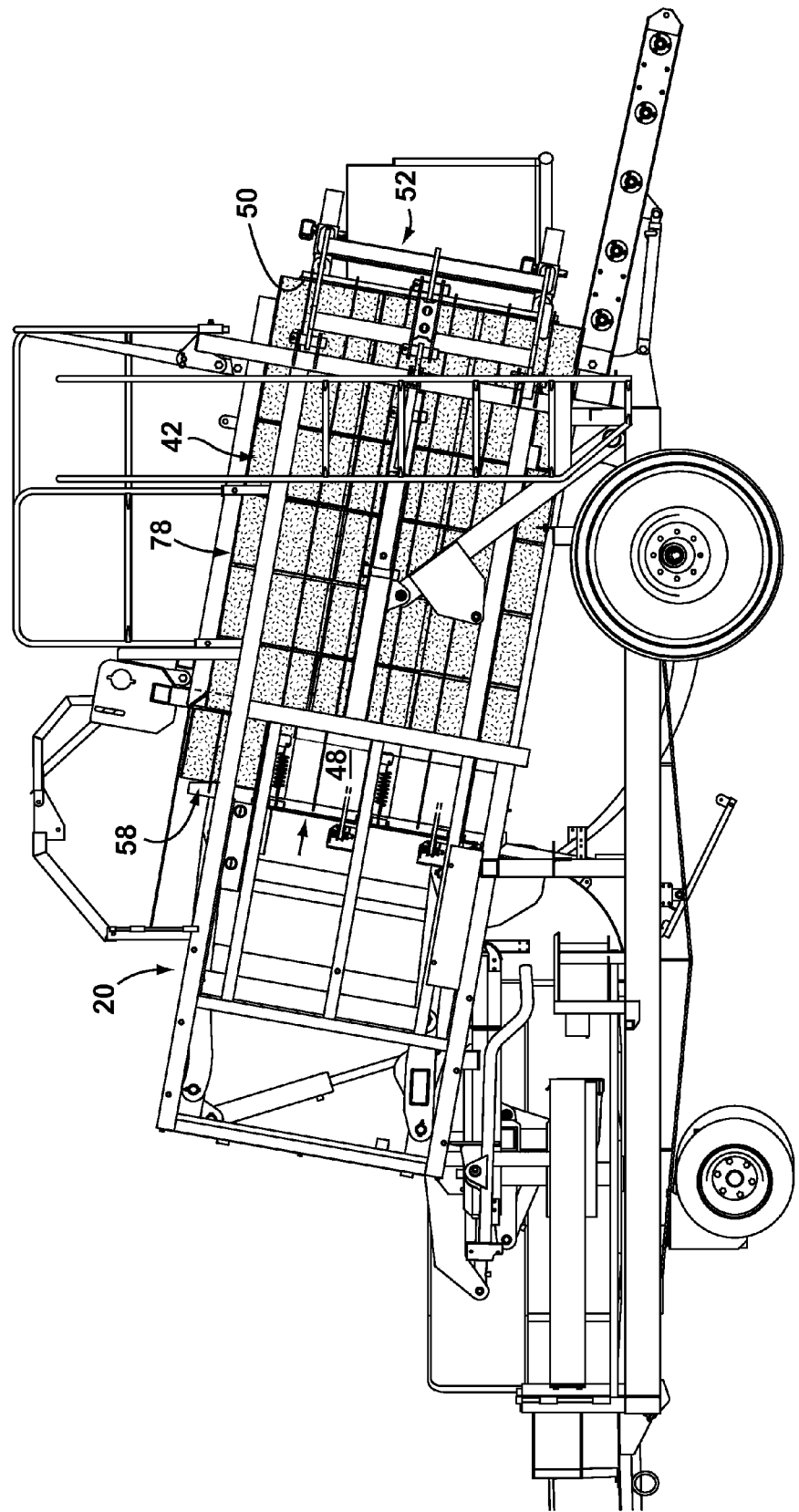
FIG. 4B is a partial cross-section of the bale stacker of FIG. 4A showing the transfer assembly pressing the bales in the compression chamber against rear doors, which are in the closed position.
Figure 4C:
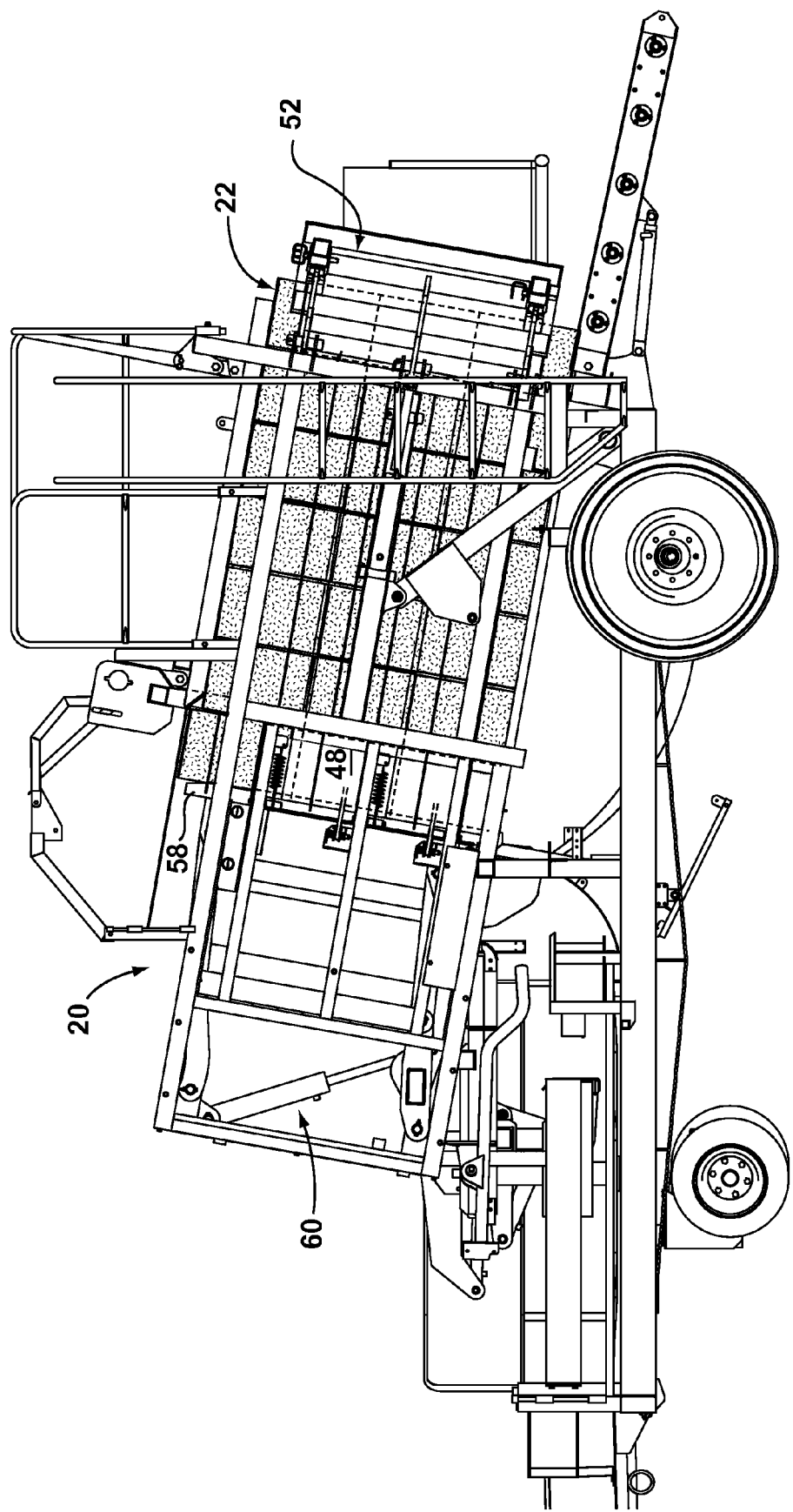
FIG. 4C is a partial cross-section of the bale stacker of FIG. 4B showing the bales in the compression chamber after compression thereof by the transfer assembly, with the rear doors in the open position.
Figure 4D:
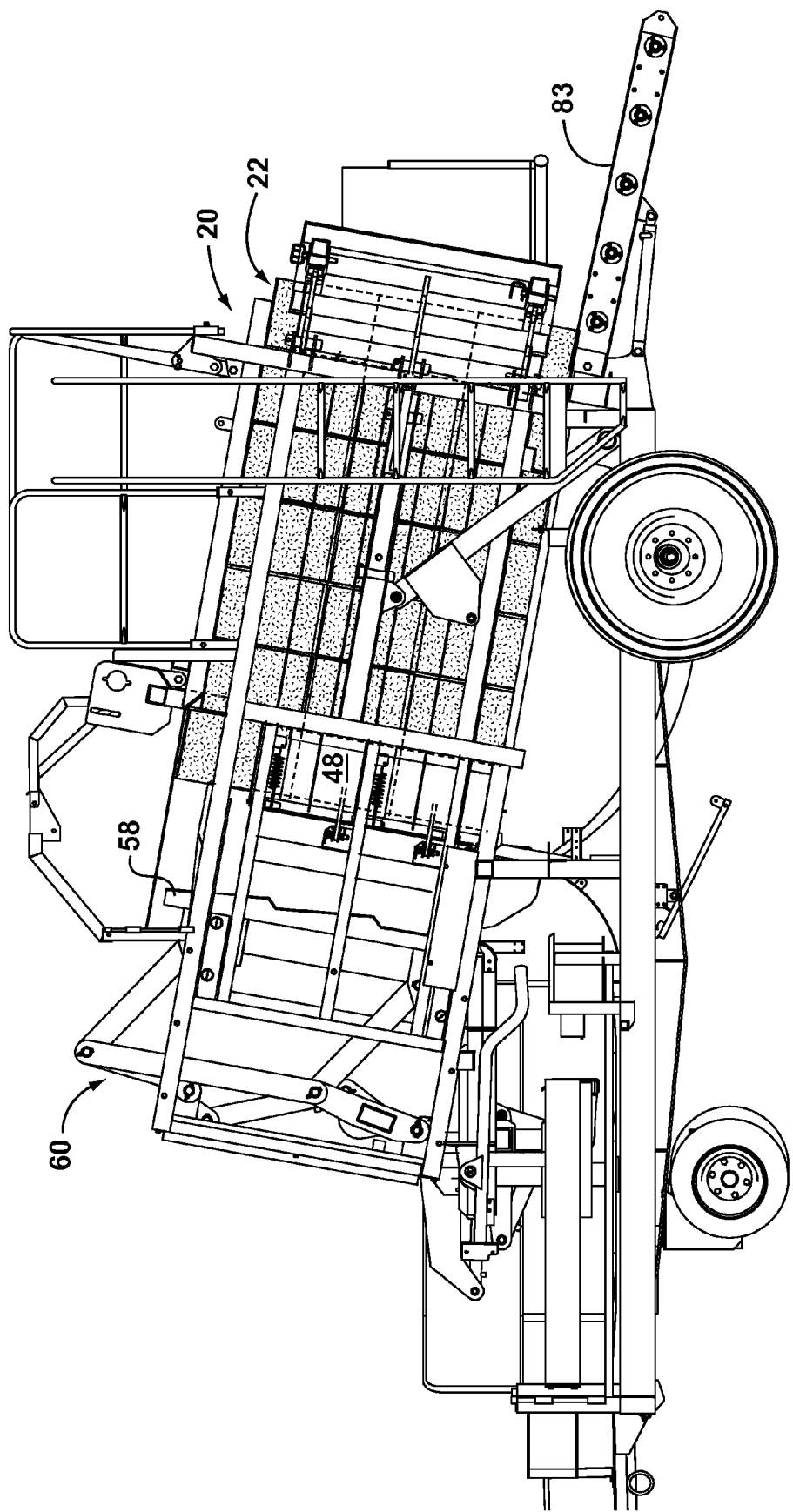
FIG. 4D is a partial cross-section of the bale stacker of FIG. 4C showing the bales in the compression chamber after compression thereof by the transfer assembly with the transfer assembly positioned to permit loading of the first column of a subsequent bale bundle.

In FIG. 4A, a seventh column (i.e., the last column in the group 78 shown) is shown in the loading chamber 44. As shown in FIG. 4A, the platen 58 is about to push in the direction shown by arrow "A7". In FIG. 4B, the platen 58 pushes the seventh column into the compression chamber 24, causing the first column in the group 78 to engage the inside surface 50 of the rear doors 52, which are closed. Accordingly, the group 78 is shown in FIG. 4B positioned in the compression chamber 24, after the seventh column has been pushed into the compression chamber 24. At this point, the compression of the group 78 of bales in the direction of downstream travel (i.e., lengthwise) takes place, i.e., due to the platen 58 pushing the seventh column into the compression chamber 24. The group 78 is tied with tying material 80 (i.e., twine) while such compression is taking place.

While the group 78 of bales is compressed by the transfer assembly 60, the knotter 82 ties the tying material 80 around the group 78 of bales. Once the tying has been completed, the group of bales 78 has been consolidated into the bale bundle 22.

It is important for the tying to take place during compression lengthwise because, after such compression, the material in the bales rebounds. It is intended that the rebounding of the material in the bales will exert outward pressure on the tying material 80, thereby causing the tying material 80 to hold the bales together tightly. As is known in the art, it is desirable that the bales be held together in the bundle as tightly as possible.

After such lengthwise compression and the tying, the rear doors 52 are opened. This causes the resilient rebounding of the material (i.e., hay) to take place which is directed primarily rearwardly, rather than frontwards. Frontward expansion is not possible at this point because the platen 58 is still in position, engaged with the seventh column.

It has been found that compression of the bales from top to bottom thereof is generally easier than compression thereof from sidewall to sidewall. This is due to the manner in which the bales are made, and the resilient nature of the hay. For this reason, the bales are positioned in the compression chamber 24 with sidewalls directed upwardly and downwardly. Accordingly, the bundle 22 is more likely to hold its shape better when the bales used to form it are positioned as described.

When the bales 10 are formed, they are bound with twine or any other suitable tying material, as is known in the art, and each bale has some degree of structural strength, or internal cohesiveness. When consolidating the bales into the bale bundle, it is desirable to compress the bale bundle before tying, because the hay is resilient, and rebounds after tying, and after the compression is released, so that the bales tightly press outwardly against the tying material. This outward expansion or rebounding is important because it is undesirable that bales in a bundle be "loose", as this may interfere with stacking the bundle, or otherwise working with the bundle. However, over-compression of individual bales can be harmful, especially over an extended period of time, because such over-compression can eliminate or reduce the internal cohesiveness of the bale, and undermine its ability to rebound after compression.

Accordingly, the extent of compression of each bale, and the direction in which each bale is compressed, preferably is controlled in the bale stacker. Because the bales are more easily compressed in a direction which is from top wall to bottom wall (or vice versa), the bales are positioned on their sidewalls in the loading chamber 44 (i.e., in the columns) and subsequently in the compression chamber. (The bales are also positioned in this way because this is more suitable for the desired dimensions of the bundle after it has been formed.) Conversely, compression of each bale in the other direction (i.e., sidewall to sidewall) is somewhat more difficult, and therefore is limited to the extent caused by the front portion 40 and maintained by the back portion 38.

The bundles preferably are sized to fit into a high cube van, which has an inside height of approximately 110 inches. Preferably, each bundle is formed so that two bundles (one on top of another) can relatively easily fit into the high cube van. In practice, this means that the bundles preferably should have a height of approximately 52 to 53 inches, or less. Because of this, the rear portion preferably is approximately 51 inches above the floor 26.

Compression orthogonal to the floor 26 is maintained by the rear portion 38 over an extended period of time. This is advantageous because it results in relatively close control over the ultimate height of the bundle, after consolidation thereof. As indicated above, the height of the bundle preferably is about 52 or 53 inches (or less), for easier loading into a high cube van. However, the lengthwise compression is done over a minimal period of time, e.g., over approximately five seconds, so that the hay will rebound (after tying) to a significant extent in the lengthwise direction. In this way, the desired height of the bundle is substantially maintained, and the hay rebounds generally in the lengthwise direction to a desired extent.

In FIG. 4D, the platen 58 is shown in a retracted position, so that the first column of the next group of bales (i.e., to be formed into another bundle) may be loaded into the loading chamber 40. Preferably, the bundle 22 shown in FIG. 4D is pushed out of the compression chamber 24 when the subsequent columns of the following group of bales (not shown in FIG. 4D) are pushed into the compression chamber 24 by the platen 58. (Depending on conditions, five or six subsequent columns may be loaded and pushed into the compression chamber before the bundle 22 is pushed out.) The bundle 22 exits via the downstream opening, and rolls down a ramp 83 which preferably is included in the bale stacker 20 to facilitate movement of the bundle 22. Preferably, the ramp has rollers or other means for promoting movement of the bundle down the ramp 83 under the influence of gravity, as is known in the art.

Figure 3B:
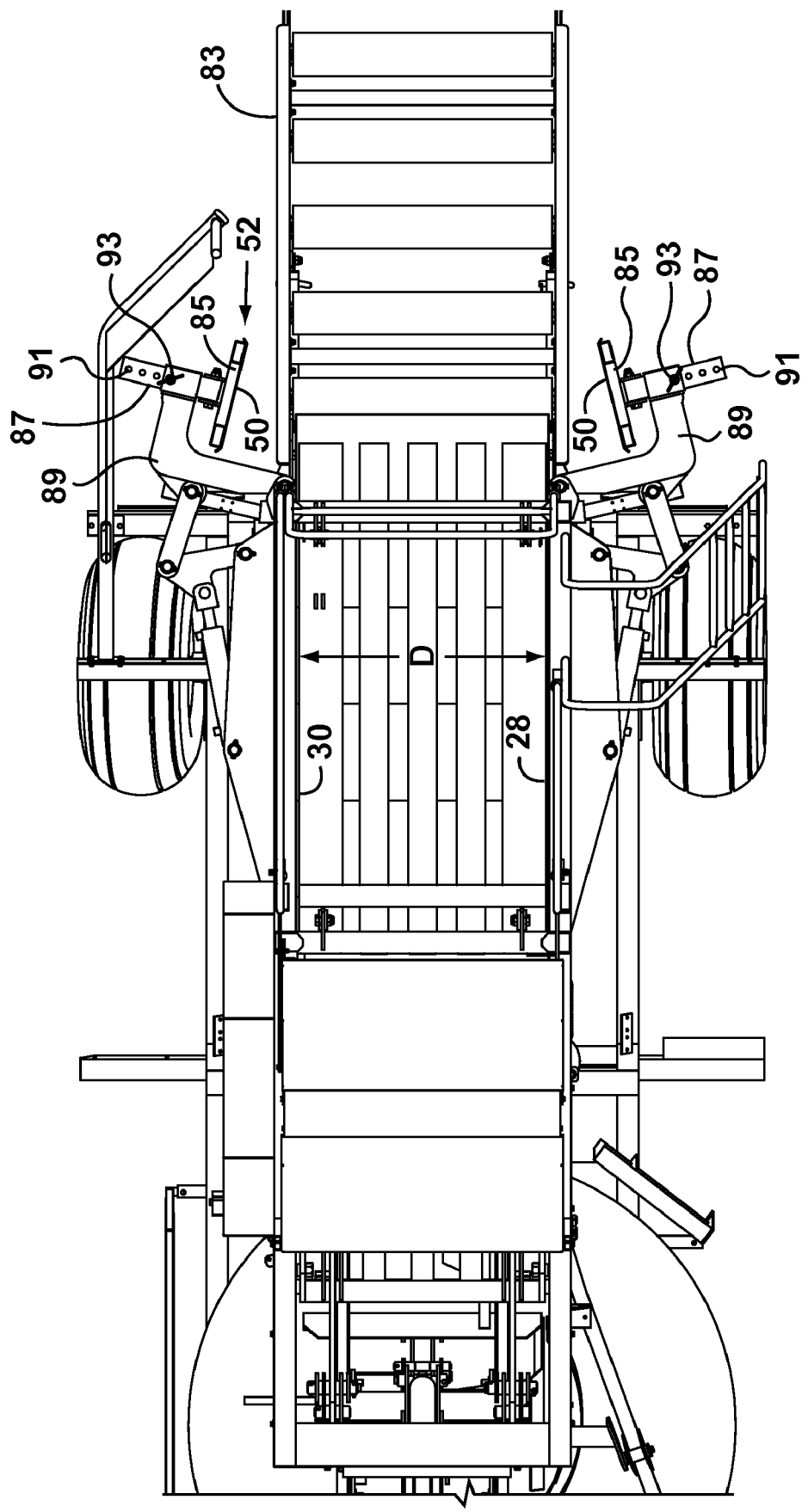
FIG. 3B is a top view of the bale stacker of FIG. 2, with the rear doors in the open position.
Figure 3C:
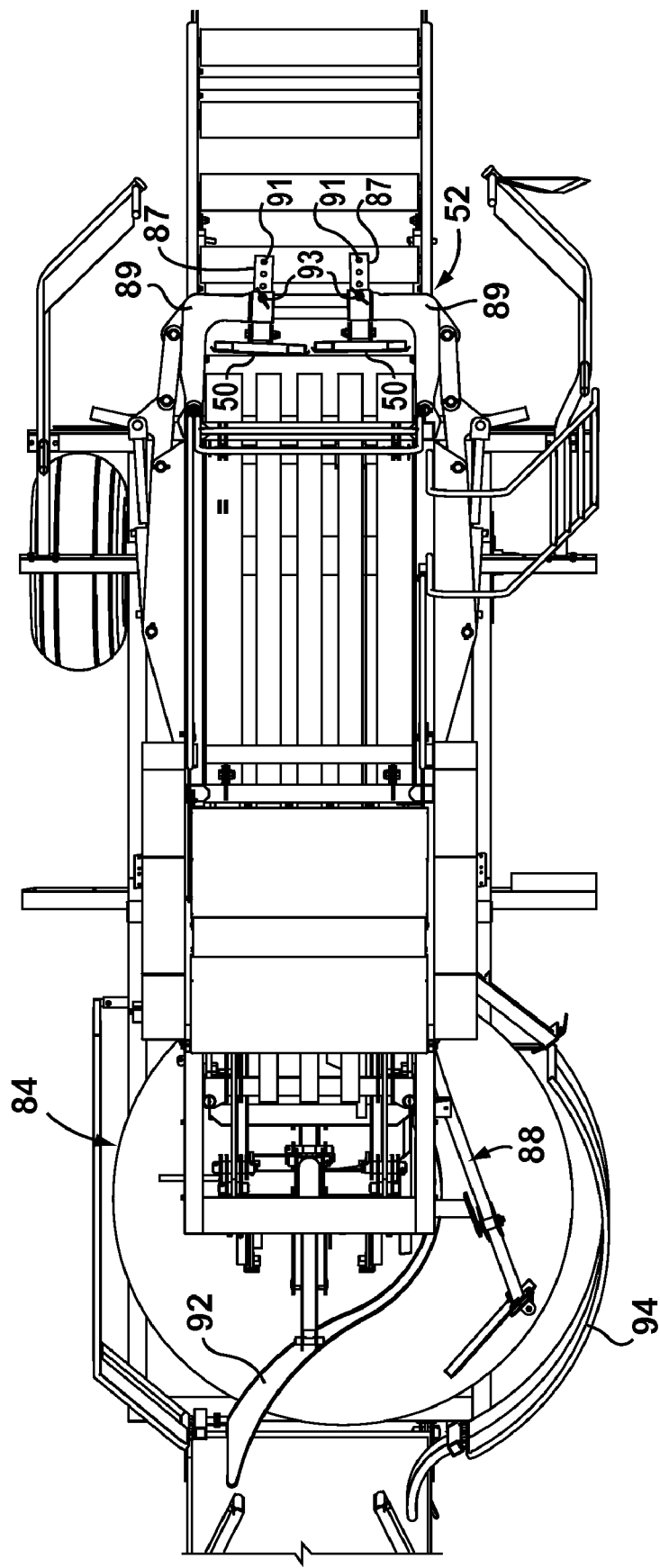
FIG. 3C is a top view of the bale stacker of FIG. 2, with the rear doors in a closed position.

From the foregoing description, it can be seen that the extent of compression lengthwise is important—i.e., such compression should preferably be only to the desired extent. The distance between the surface 56 of the platen 58, when the transfer assembly 60 is fully extended, and the front surface 50 of the rear doors 52, when the rear doors 52 are closed, preferably is adjustable, so that the conditions of the bales can be taken into account and the lengthwise compression is kept within the desired range. As can be seen in FIGS. 3B and 3C, the surface 50 preferably is on two separate panels 85 formed with mounting elements 87 which are mounted on arms 89 respectively. The mounting elements 87 include holes 91 in which pins 93 are receivable, the mounting elements 87 being temporarily (but securely) attachable to the arms 89 by the pins 93. As can be seen in FIGS. 3B and 3C, the position of the panels 85 on the mounting elements 87 can be changed so that the panels 85 are further out or closer to the arms 89 respectively, as the case may be. Accordingly, the position of the front surface 50 relative to the surface 56 of the platen 58 (when the platen is fully extended) can be varied by attaching the mounting elements 87 at various of the holes 91.

Figure 5:
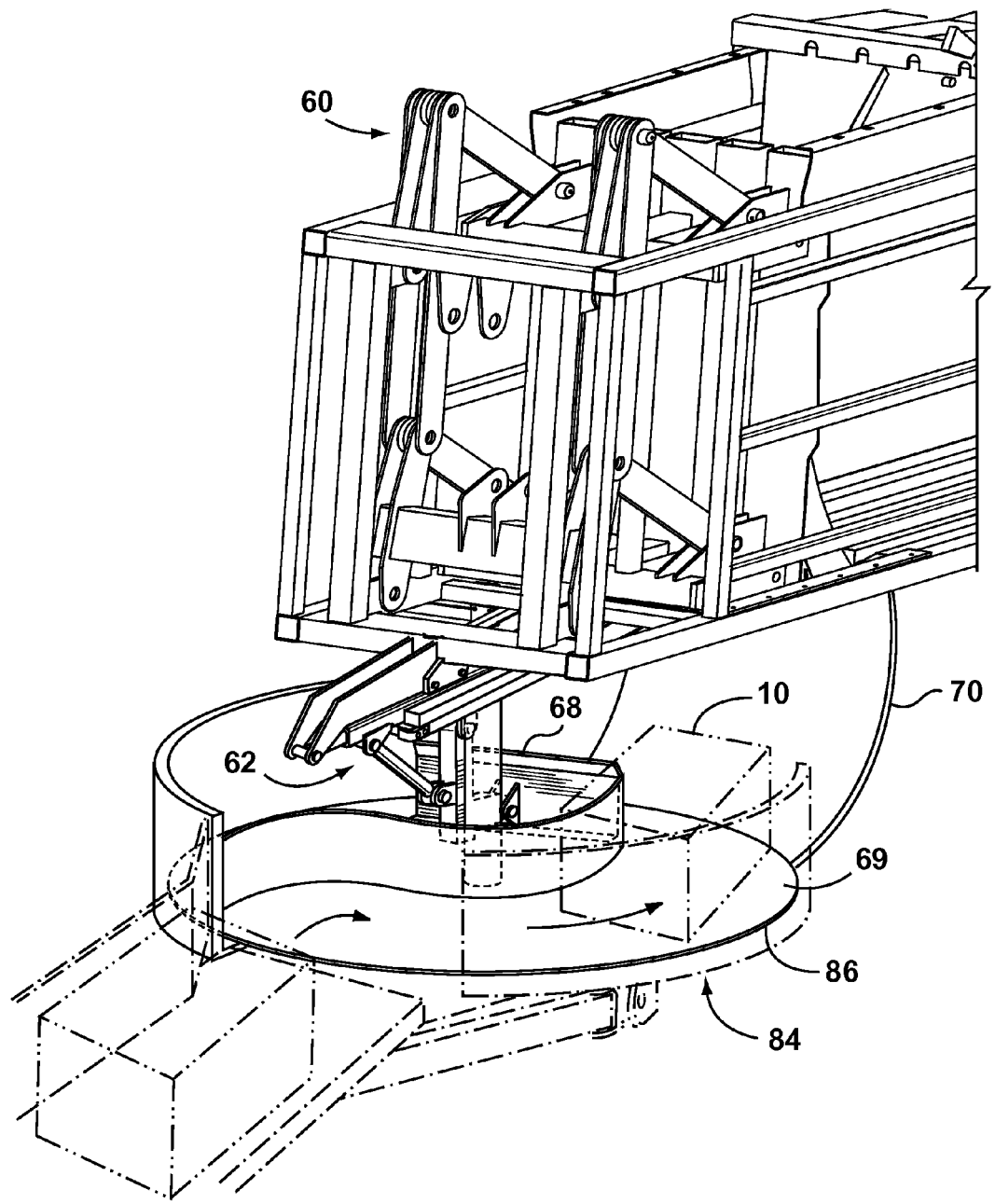
FIG. 5 is an isometric view of an embodiment of a table assembly of the invention and an embodiment of an injector assembly of the invention, drawn at a larger scale.
Figure 9:
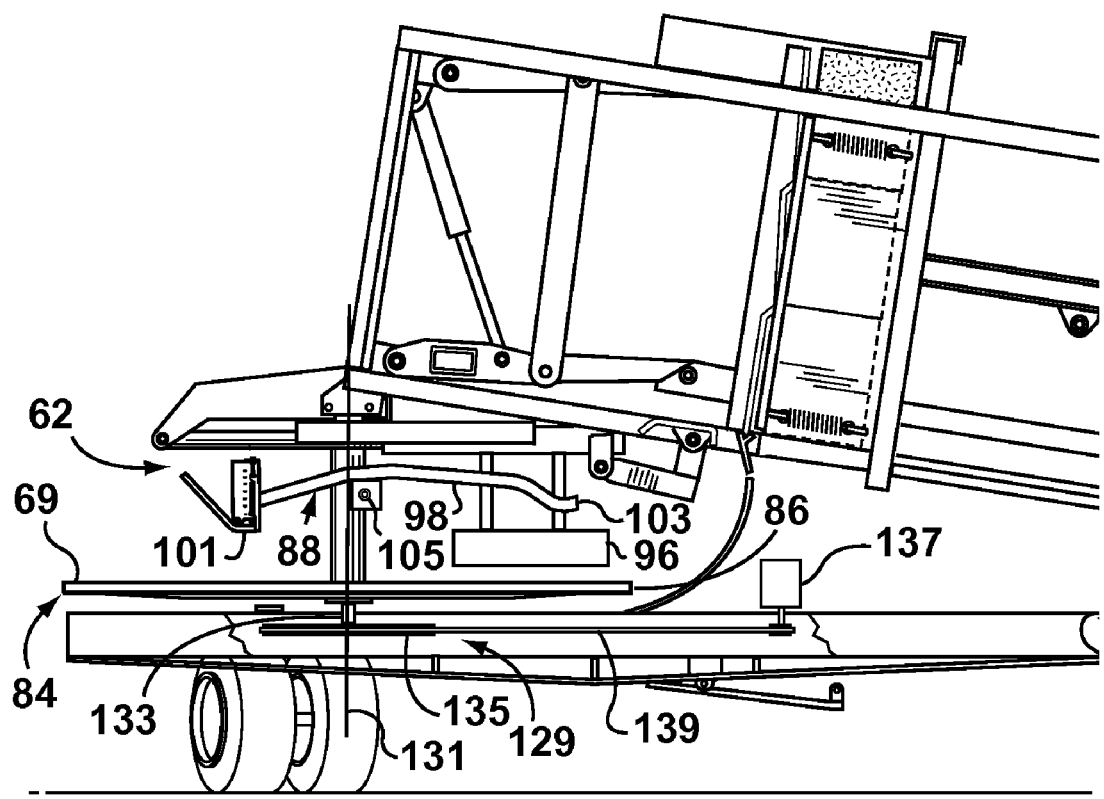
FIG. 9 is a side view of the table assembly of FIG. 8A showing a spacer bar, drawn at a larger scale.

As indicated above, the bales preferably are provided to the injector assembly 62 on the table surface 69. The bale stacker 20 preferably includes a table assembly 84 (FIG. 5). The table assembly 84 is for transporting bales to the injector assembly 62. The table assembly 84 preferably includes a table 86 having the substantially flat table surface 69. It is preferred also that the table surface 69 is adapted to permit sliding movement of the table 86 under the bale. The table assembly 84 preferably also includes a means 129 for rotating the table 86 about a substantially vertical axis 131 (FIG. 9). As can be seen in FIG. 9, the axis 131 preferably is defined by an axle element 133, to which is attached a sprocket 135 or similar device. The means 129 preferably also includes a motor 137 for rotating the table 86, and a power transmission element 139 connecting the motor and the sprocket 135. As will be appreciated by those skilled in the art, there are many different ways in which rotation of the table 86 could be effected, and the means for rotation 129 illustrated in FIG. 9 is exemplary only.

It is also preferred that the table assembly 84 includes a bale control device 88 (FIG. 9) for spacing the bales apart from each other on the table surface 69 by an approximate predetermined distance, as will be described. The bale control device 88 causes the bales to be provided to the injector assembly 62 at discrete intervals, thereby preventing the bales from interfering with the operation of the injector assembly 62 by clogging it.

Figure 6A:
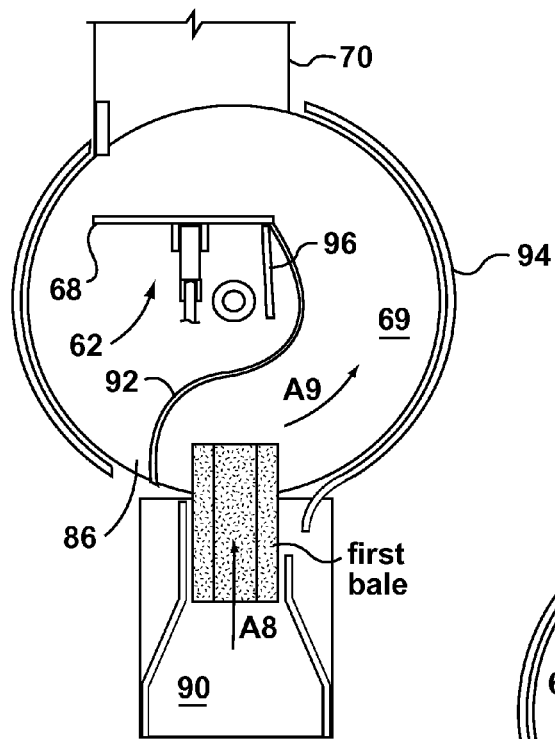
FIG. 6A is a top view of the table assembly of FIG. 5 showing a first bale entering onto a table of the table assembly, drawn at a smaller scale.
Figure 6B:
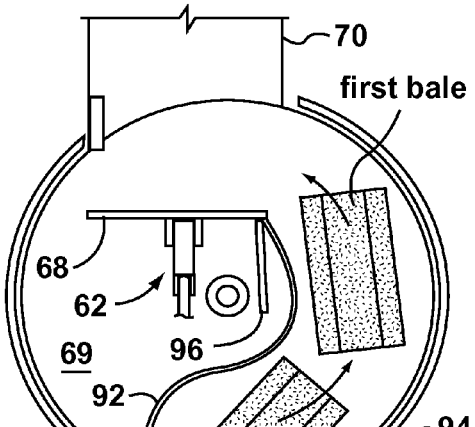
FIG. 6B is a top view of the table assembly of FIG. 6A showing the first bale and a second bale entering onto the table.
Figure 6C:
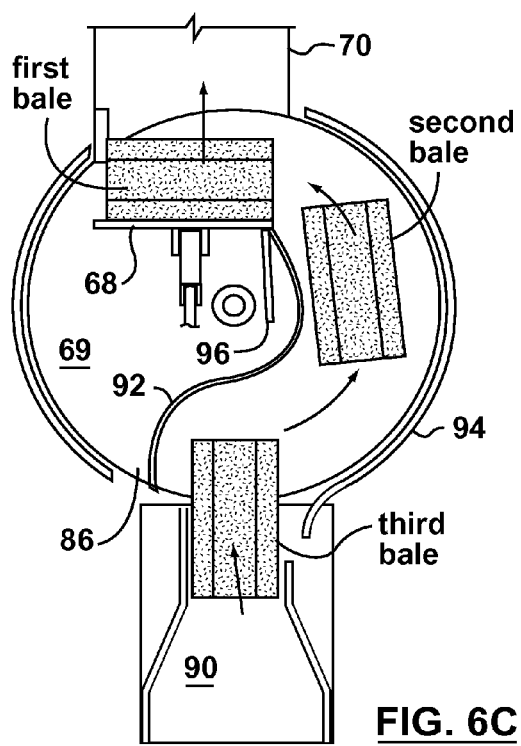
FIG. 6C is a top view of the table assembly of FIG. 6B showing the first bale positioned in the injector assembly for loading thereby, and a third bale entering onto the table.

The manner in which the table assembly 84 transports bales to the injector assembly 62 is shown in FIGS. 6A-6C. In FIG. 6A, a first bale (identified as such) is moved in the direction shown by arrow "A8" by a baler (not shown) along a chute 90 onto the table 86. (As will be described, the bale stacker 20 may be used with a baler or otherwise.) As can be seen in FIG. 6A, the table 86 preferably rotates in a counter-clockwise direction, as indicated by arrow "A9". The table 86 preferably includes an inner guide element 92 and an outer guide element 94 which serve to channel the bales toward the injector assembly 62. The guide elements 92, 94 are stationary relative to the moving table 86.

As can be seen in FIGS. 6A, 6B, and 6C, the first bale and a second and a third bale preferably are placed on the table surface 69 spaced apart an approximate predetermined distance from each other. (As described below, the transportation of the bales by the table 86 to the injector assembly 62 preferably is controlled at least in part by the bale control device 88 in any event.) The path taken by the bales is generally indicated by arrows in FIG. 6B, and as can be seen in FIG. 6C, the net result is that a sidewall of the first bale 10 is positioned for engagement with the blade 68 of the injector assembly 62. The injector assembly 62 preferably includes a bale stop 96 which moves in concert with the blade 68, as will be described. The bale stop 96 also partially controls the movement of bales to the injector assembly 62.

Figure 8B:
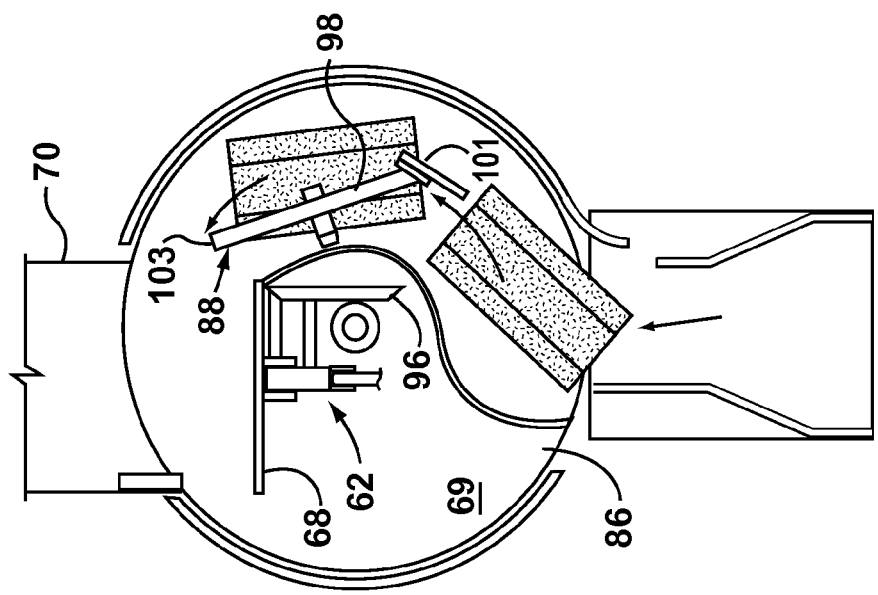
FIG. 8B is a top view of the table assembly of FIG. 8A showing the leading bale moving underneath a spacer bar and a first following bale entering onto the table.
Figure 8A:
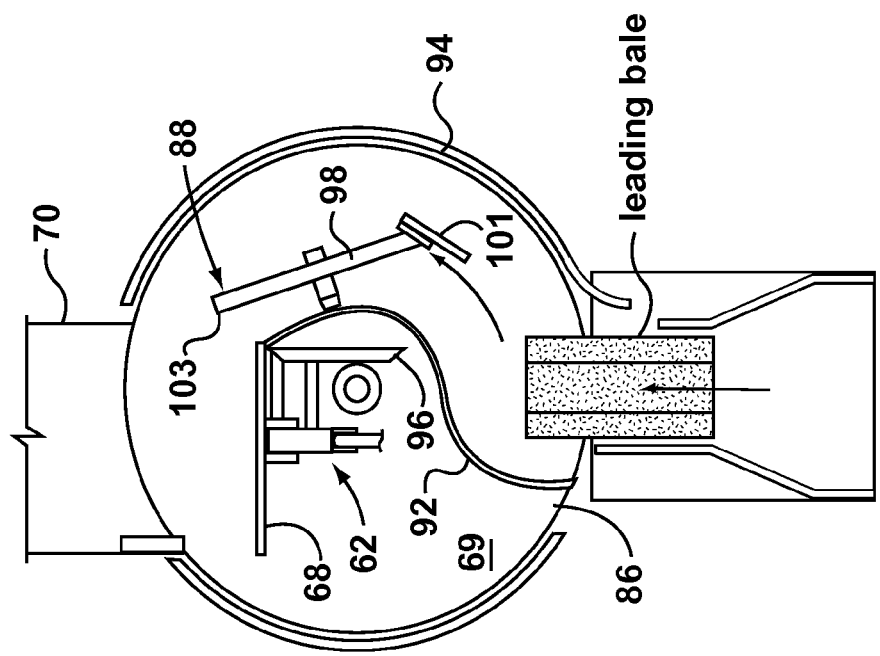
FIG. 8A is a top view of another embodiment of the table assembly of the invention showing a leading bale entering onto the table, drawn at a smaller scale.
Figure 8D:
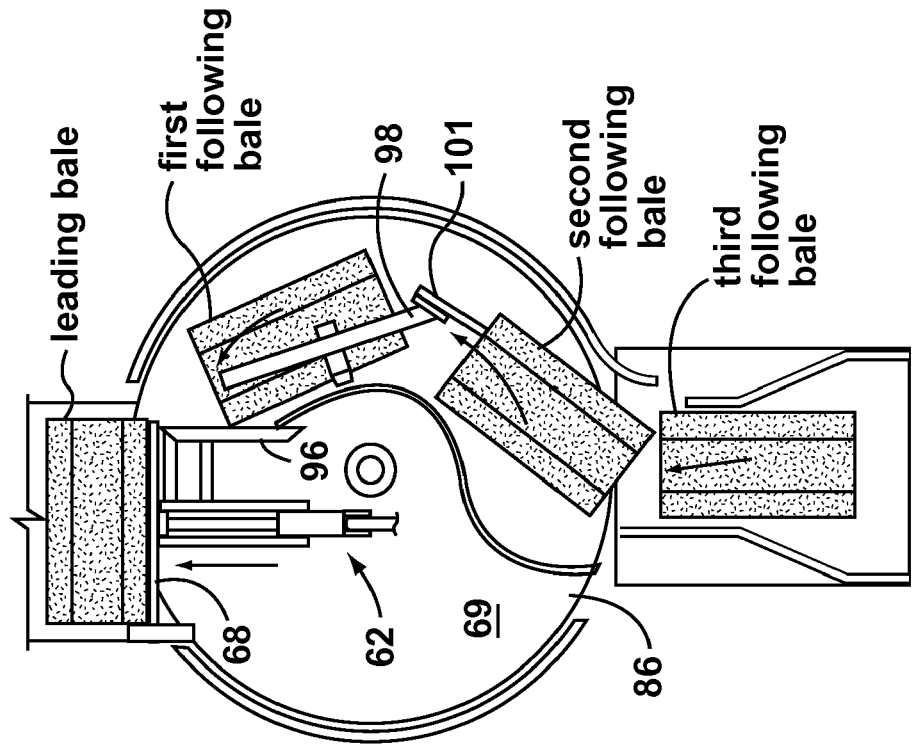
FIG. 8D is a top view of the table assembly of FIG. 8C showing a third following bale entering onto the table.
Figure 8C:
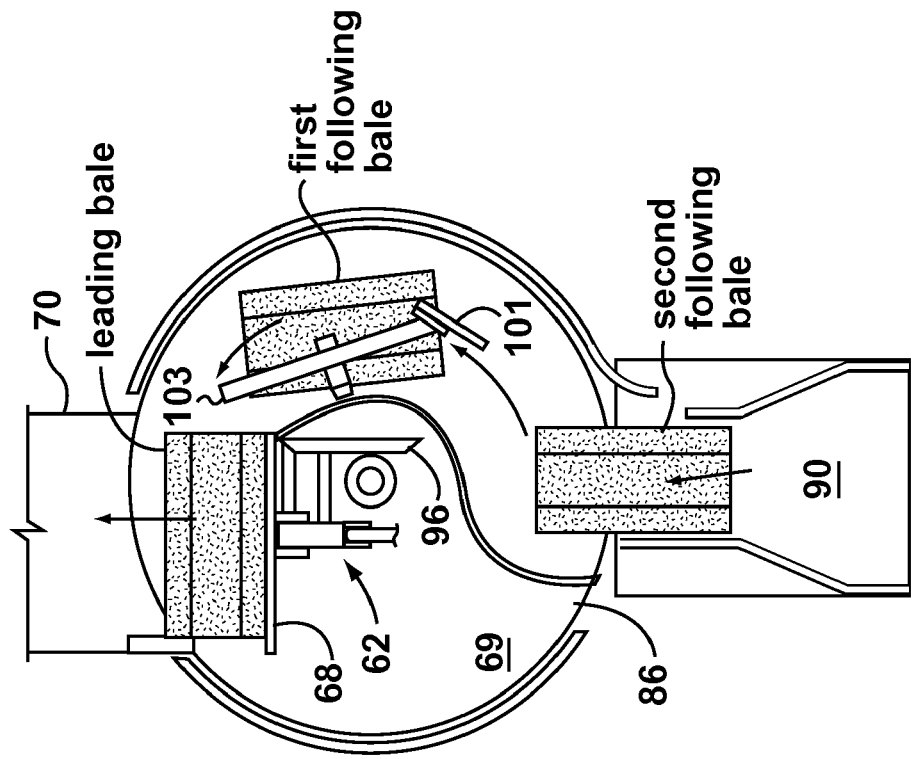
FIG. 8C is a top view of the table assembly of FIG. 8A showing the leading bale positioned in the injector assembly, the first following bale moving underneath the spacer bar, and a second following bale entering onto the table.

The use of the bale control device 88 (referred to hereinafter as a spacer bar) and the bale stop 96 to control the movement of bales on the table is shown in FIGS. 8A-8D, 9, and 10A-10E. As can be seen in FIGS. 8A and 8B, the spacer bar has an elongate body 98. In FIG. 8B, a leading bale is moved by the table 86 underneath an upstream end 101 of the body 98. The leading bale is shown in FIG. 8C as having been received in the injector assembly 62, and is positioned in front of the blade 68. In the meantime, after the leading bale moves past a downstream end 103 of the body 98, a first following bale moves underneath the upstream end 101 of the body 98 (FIG. 8C). At the same time, a second following bale is placed on the table 86 (FIG. 8C).

In FIG. 8D, because the first hydraulic cylinder 64 of the injector assembly 62 is extended at least somewhat, the bale stop 96 prevents the first following bale from proceeding further, and consequently interfering with the operation of the injector assembly. Because the downstream end 103 of the body 98 is positioned on the first following bale, the upstream end 101 is positioned to prevent the second following bale from proceeding further towards the injector assembly 62, as will be described. As can be seen in FIG. 8D, a third following bale is unable to proceed onto the table, because the second following bale is (at the point shown in FIG. 8D) bumping into the second following bale. The relative positions of the bale control device 88 and the bale stop 96, when the blade is in the extended position, are shown in FIG. 9. (The second hydraulic cylinder 66 in the injector assembly 62 has not been shown in FIG. 9 for clarity of illustration.)

Figure 10A:
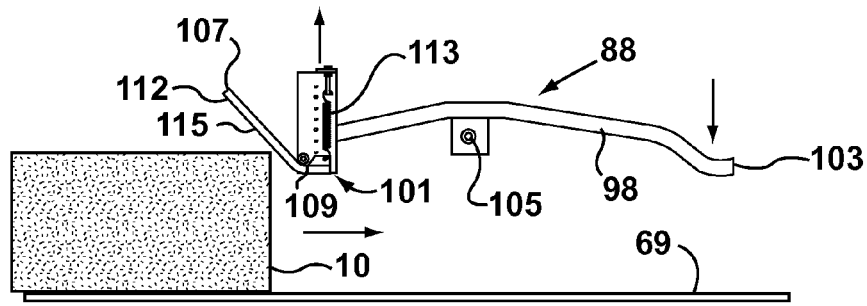
FIG. 10A is a side view of the spacer bar included in the table assembly of FIG. 8A, drawn at a larger scale.

The operation of the spacer bar (or bale control device) 88 is shown in FIGS. 10A-10E. As can be seen in FIG. 10A, the body 98 of the spacer bar 88 is pivotable about a pin 105. The body 98 is pivotable between a first position (FIG. 10B), in which the upstream end 101 is raised to permit the leading bale to pass underneath the upstream end 101 and the downstream end 103 is correspondingly lowered, and a second position (FIGS. 10C and 10D), in which the downstream end 103 is raised to engage the leading bale. When the downstream end 103 is so raised, the upstream end 101 is correspondingly lowered. As can be seen in FIGS. 8A-8D and 10A-10E, the table surface 69 is adapted to move relative to the bale while the bale is restrained by the upstream end 101, and the table surface 69 ultimately moves the bale past the upstream end 101. As described above, the bale may be held under the downstream end 103 for some time because the bale is held substantially stationary relative to the spacer bar 88 by the bale stop 96, i.e., the bale engages the bale stop 96 when the bale stop is in its path. However, once the bale stop 96 is moved out of the path of the bale, the bale is moved by the table 86 away from the spacer bar 88, and into position in front of the blade 68 of the injector assembly 62.

Preferably, the spacer bar 88 includes a shoe 107 mounted on a pin 109 extending from a bracket 111 positioned at the upstream end 101. Preferably, the shoe is pivotable between an up position (FIG. 10D) and a down position (FIGS. 10A-10C, 10E) about the pin 109. The shoe 107 has an engagement surface 112, and is biased by a biasing means 113 (preferably, a spring) to the down position.

As can be seen in FIG. 10A, when the body 98 is positioned midway between its first and second positions, an initial bale engages the shoe 107 beneath a midway point 115 on the engagement surface 112, so that the bale engages the shoe 107 and slides underneath the shoe 107, causing the body's upstream end 101 to pivot upwardly, and also consequently causing the downstream end 103 to pivot downwardly to a corresponding extent. Preferably, the body 98 is balanced so that, when neither of the ends 101, 103 is engaged with a bale, the body 98 is positioned in the midway position shown in FIG. 10A.

Figure 10B:
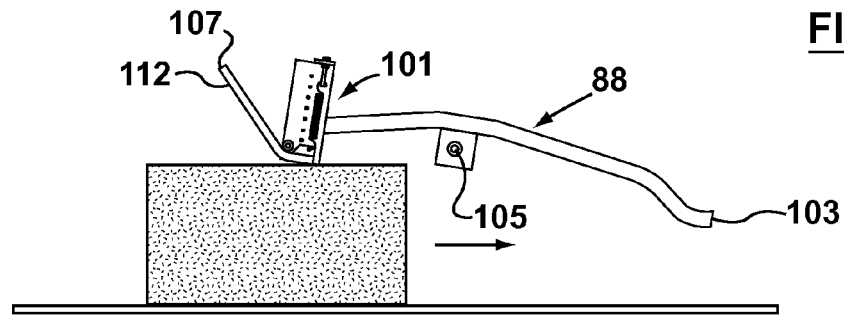
FIG. 10B is a side view showing the spacer bar of FIG. 10A moved into a first position upon engagement of a first end of the spacer bar by the leading bale of FIG. 8A.

As shown in FIG. 10B, when the body 98 is in the first position, the shoe 107 permits the bale to pass underneath the upstream end 101. The shoe 107 preferably engages the top side of the bale as it passes underneath the upstream end 101.

Figure 10C:
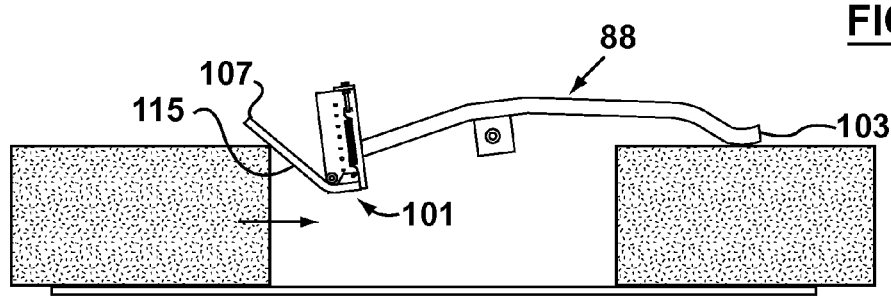
FIG. 10C is a side view showing the spacer bar 10A moved into a second position upon engagement of a second end of the spacer bar by the leading bale.
Figure 10D:
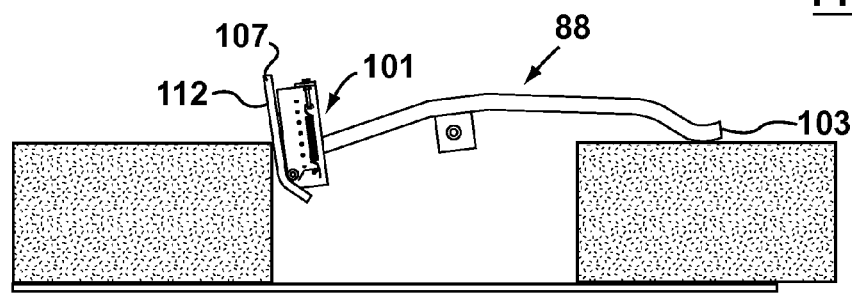
FIG. 10D is a side view of a shoe on the first end of the spacer bar of FIG. 10A showing engagement of the first following bale with the shoe when the spacer bar is in the second position, to stop movement of the first following bale relative to the injector assembly.

As can also be seen in FIG. 10B, the downstream end 103 is configured so that the bale pushes the downstream end 103 upwardly to the second position, when the bale engages the downstream end 103. In FIG. 10C, the body 98 is shown in the second position thereof, with the downstream end 103 lightly engaged with the top side of the initial bale. The upstream end 101 is lowered to a corresponding extent, with the result that the first following bale engages the shoe engagement surface 112 at a point above the midway point 115. In this situation, instead of the first following bale sliding underneath the shoe 107, the first following bale engages the shoe 107, and causes the shoe 107 to pivot upwardly to the up position (FIG. 10D). With the body 98 and the shoe 107 in this position, the bale is stopped from proceeding, as it can be seen that the first following bale cannot pass underneath the upstream end 101 when the shoe is positioned relatively low with respect to the bale's top side. The table surface 69 continues to move underneath the bale relative to the bale's bottom side, creating a relatively light pressure causing the bale to press forwardly, i.e., past the upstream end 101.

Figure 10E:
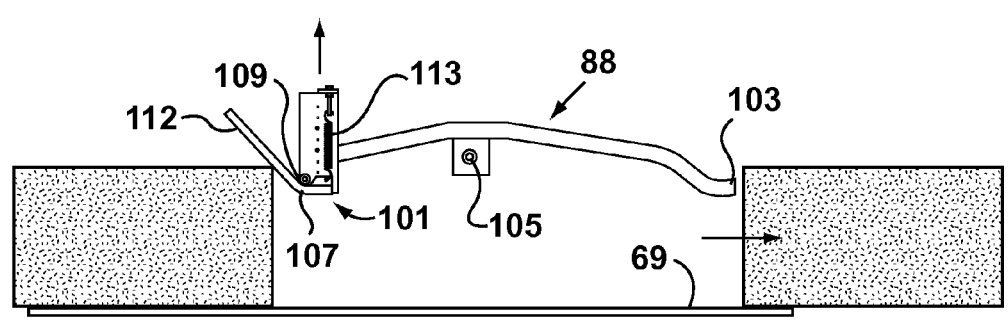
FIG. 10E is a side view of the spacer bar of FIG. 10A showing the spacer bar returning to the first position upon disengagement of the leading bale with the second end of the spacer bar.

Finally, FIG. 10E shows that, once the initial bale moves past the downstream end 103, the upstream end 101 is moved upwardly by the shoe 107. This takes place because the shoe 107 presses down on the bale as it returns to the position to which it is biased, causing the upstream end to move upwardly. In this position, the first following bale engages the shoe 107 at a point below the midway point 115, so that the first following bale can push the upstream end upwardly, and pass underneath the upward end 101.

Figure 11A:
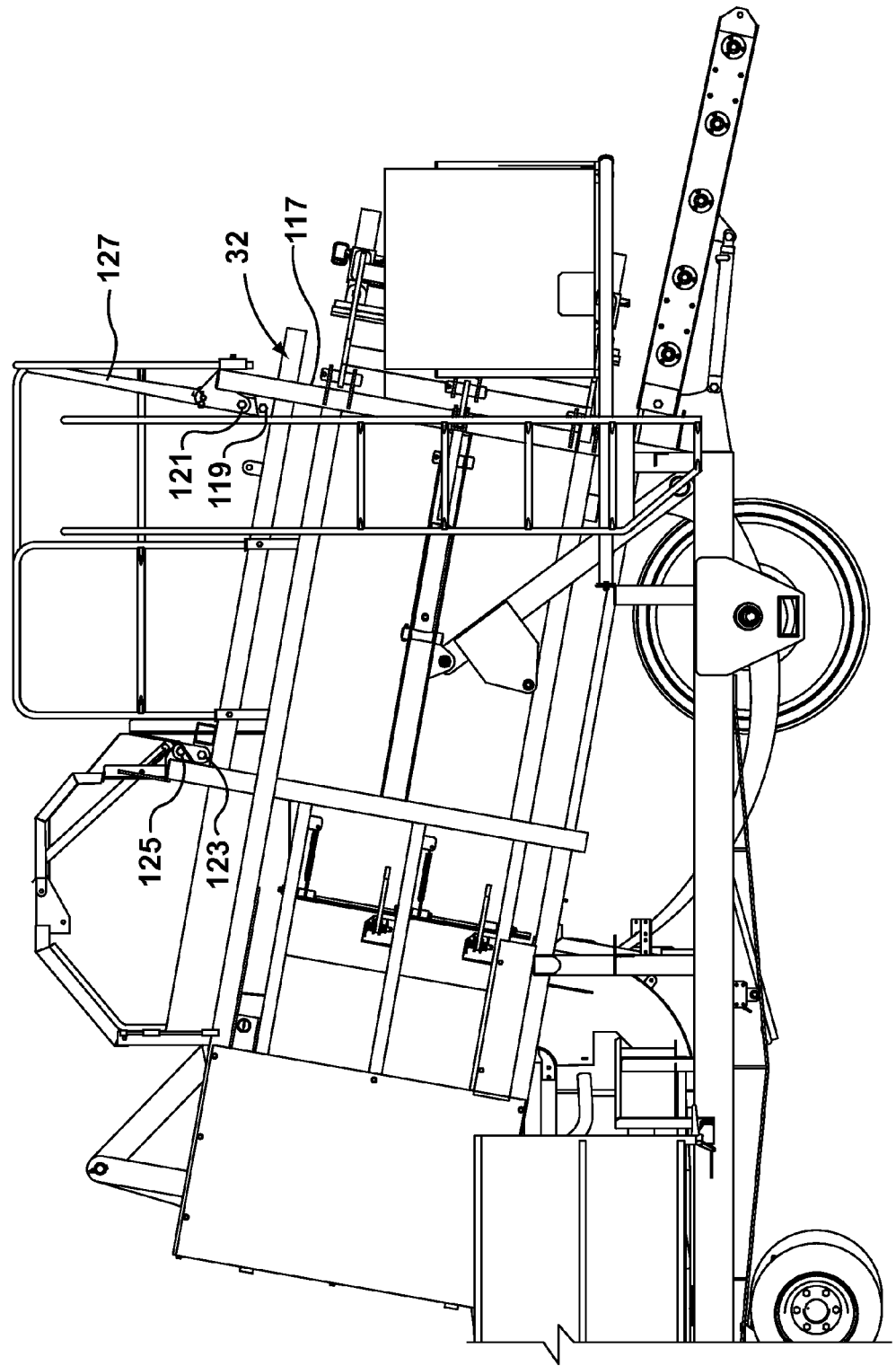
FIG. 11A is a side view of a portion of an embodiment of the bale stacker of the invention showing the compression chamber ceiling in a compression position.
Figure 11B:
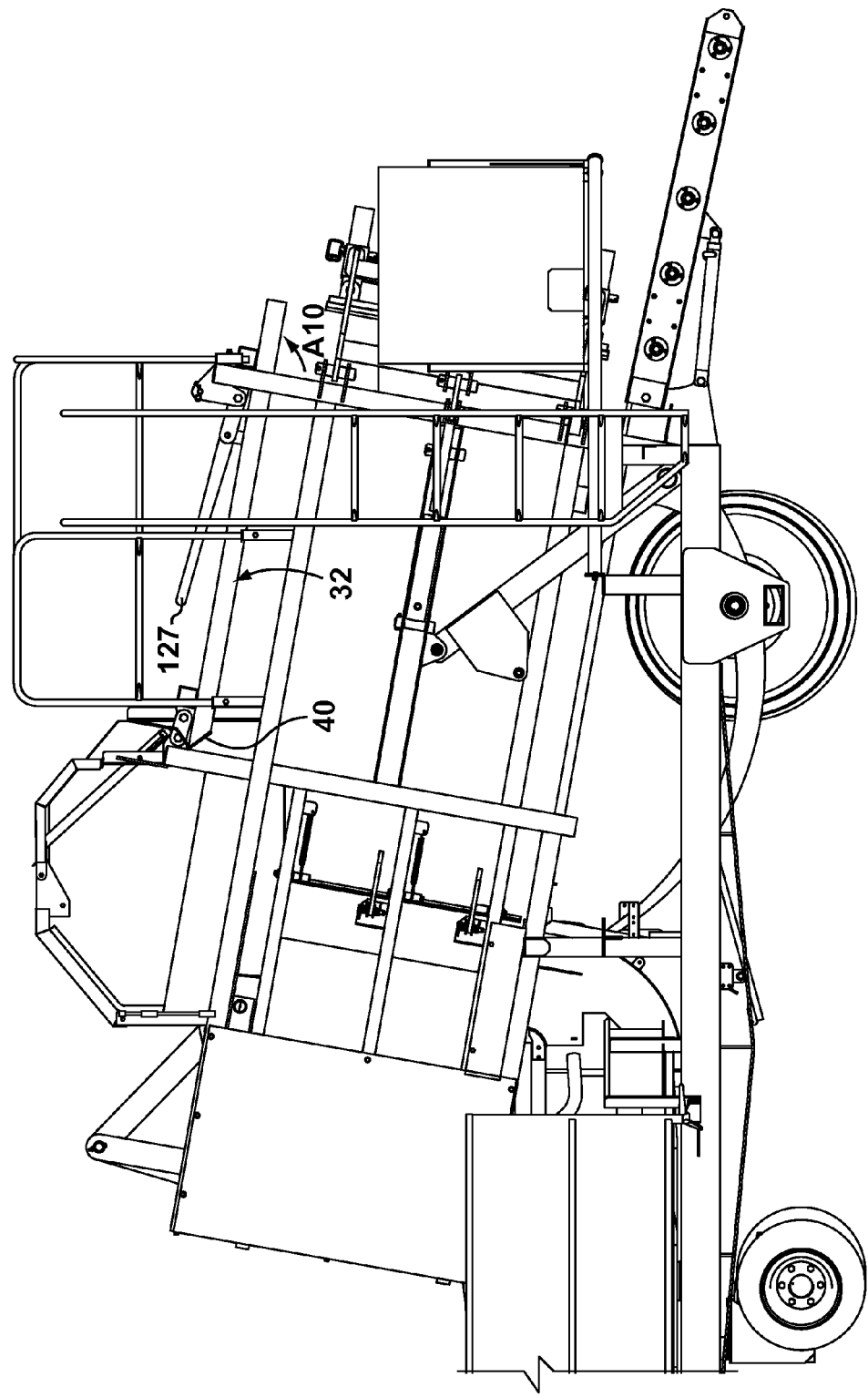
FIG. 11B is a side view of the portion of the bale stacker of FIG. 11A showing the compression chamber ceiling in a released position.

As can be seen in FIGS. 11A and 11B, the compression chamber ceiling 32 is movable between a compression position (FIG. 11A) and a released position (FIG. 11B). In the released position, the ceiling 32 is located approximately three to four inches above the ceiling 32 when it is in the compression position.

This feature is useful when, for example, the bundle 22 is to be removed from the compression chamber 24, but there are no additional bales available for processing. Such a situation may arise, for example, when the bales in a particular field have been collected, and no bales remain in such field. In particular, this feature of the invention is useful where, for example, the bale stacker 20 is used for consolidating bales from different farmers, i.e., the operator of the bale stacker is working on a contract basis, and mixing of bales from different fields is undesirable.

As can be seen in FIG. 11A, the ceiling 32 preferably is mounted to a frame 117 of the bale stacker via a parallel linkage which includes pins 119, 121, 123 and 125. As can be seen in FIGS. 11A and 11B, the movement of the ceiling 32 from the compression position to the released position and vice versa is effected by movement of a lever 127. The movement from the compression position to the released position is upwardly and generally toward the rear, as indicated by arrow A10. It can be seen in FIGS. 11A and 11B that, after moving the ceiling 32 to the released position, the bundle 22 can be pulled out of the compression chamber (e.g., by a tractor) relatively easily.

In use, the bale stacker is positioned as required. The bale stacker 20 preferably is mounted on wheels, and may be towed to a location where bales are fed to it, for example, via the chute 90. Alternatively, the bale stacker 20 may be towed in a field, with a device (e.g., a suitable conveyor) adapted to pick up bales directly in the field.

The bales are placed on the table 86, and as described, the spacer bar 88 and the bale stop 96 are used to control the flow of the bales to the injector assembly 62 so that the bales are fed to the injector assembly one at a time, when the blade 68 is retracted and ready to receive the next bale. The injector assembly 62 loads the bales one at a time into the loading chamber 44, to form columns 42 of three bales each. Each column 42 is separately pushed into the compression chamber 24 by the transfer assembly 60. With the seventh (and final) column for a particular group of bales 78 which is to be formed into a bundle, the push given to such seventh column by the transfer assembly (when the column is pushed into the compression chamber) serves to compress the entire group of twenty-one bales lengthwise. Such lengthwise compression is to a predetermined extent.

In addition, as each column is pushed past the front portion 40 of the ceiling 32, the front portion compresses the column orthogonally relative to the floor 26 of the compression chamber 24. Such compression is intended to be limited to a certain extent, in order that the internal cohesiveness of the bales might not be adversely affected by such compression. After the column 42 moves past the front portion 40, compression thereof orthogonal to the floor is maintained by the rear portion 38.

The group 78 is tied off while it is being compressed as described, so that the bales in the group 78 are consolidated into the bale bundle 22. Before the platen 58 is retracted, the rear doors 52 are opened, to permit a resilient expansion of the hay in the bundle 22 towards the downstream opening, generally in the downstream direction. Subsequently, the platen 58 is fully retracted, so that the subsequent columns of bales for the next group of bales may be loaded into the loading chamber 44. When the subsequent columns of the next group of bales are pushed into the compression chamber, they in turn push the bale bundle 22 out of the compression chamber, via the downstream opening. Preferably, the bundle 22 rolls down the ramp 83 under the influence of gravity. After the bundle 22 has exited the compression chamber 24, the rear doors 52 are closed, in preparation for the lengthwise compression of the next group of bales.

Any element in a claim that does not explicitly state "means for" performing a specified function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

I claim:

1. A bale stacker for consolidating a plurality of bales into a bale bundle, each said bale having top and bottom walls, two sidewalls, and two endwalls, the bale stacker comprising:
   a compression chamber at least partially defined by a floor, two substantially parallel chamber sidewalls spaced apart from each other by a predetermined distance, and a ceiling;
   the compression chamber extending between an upstream opening and a downstream opening thereof, the bales being receivable in the compression chamber via the upstream opening and the bale bundle being configured to exit the compression chamber via the downstream opening;
   the compression chamber ceiling comprising a substantially planar rear portion positioned substantially parallel to the floor;
   the compression chamber ceiling additionally comprising a front portion positioned upstream from the rear portion, the front portion being positioned in a non-parallel relationship relative to the floor for engaging said bales as said bales are moved past the front portion in a downstream direction of travel toward the downstream opening, such that said bales are compressed between the front portion and the floor;
   a loading chamber in which said bales are positionable in columns;
   front doors are positionable between the loading chamber and the compression chamber;
   a transfer assembly for moving said columns of said bales from the loading chamber into the compression chamber;
   an injector assembly for moving said bales into the loading chamber, such that said bales are formed into said columns in the loading chamber;
   the injector assembly comprising a pivotable blade for engaging each said bale respectively, said blade being movable between a retracted position, in which one of said bales is positionable in front of the blade, and an extended position, in which the bale is loadable into the loading chamber; and
   the injector assembly being configured to move each said bale substantially horizontally into a position underneath the loading chamber, and then rotate each said bale to move each said bale at least partially upwardly into the loading chamber.

2. A bale stacker according to claim 1 in which the rear portion of the compression chamber is engageable with said bales after said bales are moved downstream past the front portion such that the rear portion compresses said bales in a direction substantially orthogonal to the floor.

3. A bale stacker according to claim 1 in which the front portion has a length substantially parallel to the downstream direction of travel which is substantially less than one-half of a shorter dimension of the sidewall of each said bale.

4. A bale stacker according to claim 3 in which the front portion is positioned at an angle relative to the floor between approximately 30 degrees and approximately 75 degrees.

5. A bale stacker according to claim 1 in which the injector assembly comprises a first hydraulic cylinder operably coupled to the blade and positioned for acting in a substantially horizontal direction and a second hydraulic cylinder operably coupled to the blade and positioned for acting at an angle relative to the horizontal, to provide at least partially vertical movement of the blade as the blade is moved between the extended position and the retracted position.

6. A bale stacker according to claim 5 in which the injector assembly comprises a guide element for guiding said bales into the loading chamber as the blade is moved to the extended position.

7. A bale stacker according to claim 1 in which the injector assembly rotates each said bale by approximately 90 degrees during movement thereof into the loading chamber, such that each said bale rests on a sidewall thereof when positioned in said columns.

8. A bale stacker according to claim 7 additionally comprising a plurality of movable dogs adapted to permit passage of the bale past said dogs and to support the bale after the bale is loaded into the loading chamber.

9. A bale stacker according to claim 8 in which the transfer assembly comprises a platen for engaging each said column respectively when said column is moved into the compression chamber, the platen comprising projections positioned to engage said bales in each said column respectively to substantially align said bales in each said column approximately orthogonally relative to the floor of the compression chamber.

10. A bale stacker according to claim 1 additionally comprising at least one rear door positioned at the downstream opening and movable between a closed position, in which said at least one rear door blocks the downstream opening, and an open position, in which the downstream opening is opened, such that when said columns substantially occupy the compression chamber and said at least one rear door is positioned in the closed position, the transfer assembly compresses said columns substantially in the downstream direction by pressing said columns against said at least one rear door.

11. A bale stacker according to claim 10 additionally comprising a knotter for tying a binding material around said columns when said columns are compressed, to hold said columns together to form the bale bundle.

12. A bale stacker according to claim 1 additionally comprising a table assembly for transporting said bales consecutively to the injector assembly and positioning each said bale respectively for movement thereof by the injector assembly into the loading chamber.

13. A bale stacker according to claim 12 in which the table assembly comprises a rotatable table for feeding each said bale to the injector assembly in a predetermined position relative to the injector assembly.

14. A bale stacker according to claim 13 in which the table assembly additionally comprises a bale stop mechanism for feeding each said bale to the injector assembly separately.

15. A bale stacker according to claim 14 in which the table assembly additionally comprises a spacer bar pivotable about an axis between a first position, in which a first end thereof is pivoted upwardly to permit a leading one of said bales to pass thereunder to a second end thereof, and a second position, in which the spacer bar permits said leading bale to move away from the spacer bar and simultaneously restrains a following one of said bales.

16. A bale stacker according to claim 1 in which the compression chamber ceiling is movable between a compression position, in which the bales are compressible between the ceiling and the floor, and a released position, in which the ceiling is substantially disengaged from the bales, to permit movement of the bale bundle out of the compression chamber.

17. A bale stacker for consolidating a plurality of bales into a bale bundle, each said bale having top and bottom walls, two sidewalls, and two endwalls, the bale stacker comprising:

a compression chamber extending between an upstream opening and a downstream opening thereof, the bales being receivable in the compression chamber via the upstream opening and the bale bundle being configured to exit the compression chamber via the downstream opening;

a loading chamber in which said bales are positionable in columns;

front doors are positionable between the loading chamber and the compression chamber;

a transfer assembly for moving said columns of said bales from the loading chamber into the compression chamber;

an injector assembly for moving said bales into the loading chamber, such that said bales are formed into said columns in the loading chamber;

the injector assembly comprising a pivotable blade for engaging each said bale respectively, said blade being movable between a retracted position, in which one of said bales is positionable in front of the blade, and an extended position, in which the bale is loadable into the loading chamber; and the injector assembly being configured to move each said bale substantially horizontally into a position underneath the loading chamber, and then rotate each said bale to move each said bale at least partially upwardly into the loading chamber.

* * * * *